US012720223B2

(12) United States Patent
Liu et al.

(10) Patent No.: US 12,720,223 B2
(45) Date of Patent: Aug. 25, 2026

(54) SIGNAL PROCESSING METHOD, APPARATUS, AND DEVICE, STORAGE MEDIUM, AND COMPUTER PROGRAM

(71) Applicant: Huawei Technologies Co., Ltd., Shenzhen (CN)

(72) Inventors: Pei Liu, Shenzhen (CN); Jingduo Tian, Shenzhen (CN); Yifan Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/177,148

(22) Filed: Apr. 11, 2025

(65) Prior Publication Data

US 2025/0240538 A1 Jul. 24, 2025

Related U.S. Application Data

(63) Continuation of application No. PCT/CN2023/103954, filed on Jun. 29, 2023.

(30) Foreign Application Priority Data

Oct. 14, 2022 (CN) ........................ 202211259723.4

(51) Int. Cl.
*H04N 25/47* (2023.01)
*H04N 7/01* (2006.01)
(Continued)

(52) U.S. Cl.
CPC ........... *H04N 25/47* (2023.01); *H04N 7/0117* (2013.01); *H04N 25/41* (2023.01); *H04N 25/581* (2023.01)

(58) Field of Classification Search
CPC ...... H04N 25/47; H04N 7/0117; H04N 25/41; H04N 25/581; H04N 23/45; H04N 23/80;
(Continued)

(56) References Cited

U.S. PATENT DOCUMENTS 10,083,349 B2 * 9/2018 Park ........................ G06F 3/017
2018/0039601 A1 * 2/2018 Park ........................ G06F 17/18
(Continued)

FOREIGN PATENT DOCUMENTS

CN 112801027 A 5/2021
CN 113724142 A 11/2021
(Continued)

OTHER PUBLICATIONS

Guang Chen et al. Event-Based Neuromorphic Vision for Autonomous Driving, A paradigm shift for bio-inspired visual sensing and perception, Jul. 2020, total 16 pages.

*Primary Examiner* — Nathan J Flynn
*Assistant Examiner* — Christine A Kurien
(74) *Attorney, Agent, or Firm* — Conley Rose, P.C.

(57) ABSTRACT

A signal processing method includes obtaining an image signal and a first event signal that are of a target scene, where the first event signal is an event signal in a frame format or a stream format; performing time-dimension and/or space-dimension format conversion on the first event signal, to obtain a second event signal, where the second event signal is an event signal in a frame format; and fusing the second event signal and the image signal, to obtain a fused signal.

20 Claims, 10 Drawing Sheets

● When p=−1, and negative polarity event/E=−1, a negative polarity event occurs on a pixel ○ When p=1, and positive polarity event/E=1, a positive polarity event occurs on a pixel △ When E=0, no event occurs on a pixel

(51) Int. Cl.
*H04N 25/40* (2023.01)
*H04N 25/581* (2023.01)

(58) Field of Classification Search
CPC .... H04N 23/951; G06V 10/803; G06V 10/80; G06V 10/82; G06V 20/40; G06V 20/44; G06V 20/52; G06V 20/56
See application file for complete search history.

(56) References Cited

U.S. PATENT DOCUMENTS

| | | | | |
|---|---|---|---|---|
| 2018/0321464 | A1* | 11/2018 | Kogo | H04N 23/673 |
| 2022/0046191 | A1 | 2/2022 | Movshovich | |
| 2022/0156532 | A1* | 5/2022 | Paikin | G06N 3/04 |
| 2022/0201201 | A1* | 6/2022 | Chen | H04N 23/64 |
| 2023/0360254 | A1 | 11/2023 | Liu et al. | |

FOREIGN PATENT DOCUMENTS

| | | | |
|---|---|---|---|
| CN | 113727042 | A | 11/2021 |
| CN | 114095673 | A | 2/2022 |
| CN | 114244970 | A | 3/2022 |
| CN | 114972412 | A | 8/2022 |
| CN | 115564695 | A | 1/2023 |
| WO | 2020001034 | A1 | 1/2020 |
| WO | 2022141376 | A1 | 7/2022 |

* cited by examiner

● When p=–1, and negative polarity event/E=–1, a negative polarity event occurs on a pixel ○ When p=1, and positive polarity event/E=1, a positive polarity event occurs on a pixel △ When E=0, no event occurs on a pixel

SIGNAL PROCESSING METHOD, APPARATUS, AND DEVICE, STORAGE MEDIUM, AND COMPUTER PROGRAM

CROSS-REFERENCE TO RELATED APPLICATIONS

This is a continuation of International Patent Application No. PCT/CN2023/103954 filed on Jun. 29, 2023, which claims priority to Chinese Patent Application No. 202211259723.4 filed on Oct. 14, 2022. The disclosures of the aforementioned applications are hereby incorporated by reference in their entireties.

TECHNICAL FIELD

The present disclosure relates to the field of image processing technologies, and in particular, to a signal processing method, apparatus, and device, a storage medium, and a computer program.

BACKGROUND

An image sensor has disadvantages such as high redundancy, high delay, high noise, and a low dynamic range. Consequently, an image signal obtained by performing signal collection on a target scene by using an image sensor may be blurred, overexposed, underexposed, or the like. The image signal is blurred because an object in the target scene is shifted relative to the image sensor within an exposure time period. The image signal is overexposed because the object whitens due to excessively high luminance of the target scene or an excessively long exposure time period. The image signal is underexposed because imaging details are missing due to excessively low luminance of the target scene or an excessively short exposure time period.

Compared with an image sensor, a dynamic vision sensor (DVS) has characteristics such as a high dynamic range, high time resolution, and low power consumption. An event signal obtained by performing signal collection on the target scene by using the DVS can well capture motion information in the target scene. Therefore, the DVS has attracted extensive attention. However, an effect of executing subsequent tasks such as target detection and image quality improvement based on the event signal is poor.

SUMMARY

The present disclosure provides a signal processing method, apparatus, and device, a storage medium, and a computer program, to improve image quality. The technical solutions are as follows.

According to a first aspect, a signal processing method is provided. In the method, an image signal and a first event signal that are of a target scene are obtained, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format. Time-dimension and/or space-dimension format conversion are and/or is performed on the first event signal, to obtain a second event signal, where the second event signal is an event signal in a frame format, and resolution of the second event signal is the same as resolution of the image signal. The second event signal and the image signal are fused, to obtain a fused signal.

Time-dimension and/or space-dimension format conversion are/is performed on the first event signal, to obtain the second event signal. The second event signal is the event signal in the frame format, in other words, a format of the second event signal is similar to a format of the image signal. Therefore, the second event signal has resolution, and the resolution of the second event signal is the same as the resolution of the image signal. In this way, the second event signal and the image signal can be better fused. In addition, the image signal indicates luminance information of a plurality of pixels within an exposure time period, and the event signal indicates motion information of the plurality of pixels within the exposure time period. Therefore, the event signal and the image signal are fused, and the obtained fused signal includes both the luminance information of the plurality of pixels and the motion information of the plurality of pixels. In this way, image quality can be improved by using a dense fused signal that has both luminance information and motion information.

The exposure time period is an exposure time period of an image sensor. The format of the second event signal is any one of an event frame format, a time plane format, and a voxel grid format. An event signal in the event frame format is a frame of event signal that includes an accumulated value of event polarities corresponding to pixels in a period of time or a total quantity of event polarities. An event signal in the time plane format is a frame of event signal that includes a largest timestamp corresponding to a polarity event that occurs on pixels in a period of time. An event signal in the voxel grid format is a frame of event signal that includes a product of an accumulated value of event polarities corresponding to pixels in a period of time and a weight of the event signal in a time dimension.

The first event signal includes the event signal in the frame format and the event signal in the stream format. In different cases, manners of performing time-dimension and/or space-dimension format conversion on the first event signal to obtain the second event signal are different. The following two cases are separately described.

In a first case, the first event signal is the event signal in the frame format, the first event signal includes M frames of event signals, the second event signal includes N frames of event signals, both M and N are integers greater than or equal to 1, and M is greater than or equal to N. In this case, the M frames of event signals are grouped into N groups of event signals based on frame sequence numbers, and each of the N groups of event signals includes at least one frame of event signal with consecutive frame sequence numbers. Time-dimension and/or space-dimension format conversion are and/or is performed on each of the N groups of event signals, to obtain the N frames of event signals.

Because manners of performing time-dimension and/or space-dimension format conversion on all of the N groups of event signals are the same, one group of event signals is selected from the N groups of event signals as a target group of event signals. The following uses the target group of event signals as an example to separately describe different manners of performing format conversion on at least one frame of event signal included in the target group of event signals.

Manner 1: Time-dimension and space-dimension format conversion is performed on the at least one frame of event signal included in the target group of event signals, to obtain a frame of event signal obtained through format conversion.

A weight of each of the at least one frame of event signal in a time dimension is determined. Pixel values, in a space dimension, of pixels included in each of the at least one frame of event signal is determined. Target pixel values of the pixels included in each frame of event signal are determined based on the weight of each of the at least one frame of event signal in a time dimension and the pixel values, in a space dimension, of the pixels included in each frame of event signal. Then, target pixel values of pixels at a same location in the at least one frame of event signal are accumulated, to obtain the frame of event signal obtained through format conversion.

It should be noted that, that the at least one frame of event signal is successively traversed according to the foregoing method to obtain pixel values of pixels in the frame of event signal obtained through format conversion is merely an example. Optionally, the pixel values of the pixels in the frame of event signal obtained through format conversion can alternatively be determined in another manner. For example, interpolation processing is performed on each of the at least one frame of event signal, to obtain at least one frame of event signal obtained through interpolation processing. A weight, in a time dimension, of each frame of event signal obtained through interpolation processing in the at least one frame of event signal obtained through interpolation processing is determined. Target pixel values of pixels included in each frame of event signal obtained through interpolation processing are determined based on the weight, in a time dimension, of each frame of event signal obtained through interpolation processing in the at least one frame of event signal obtained through interpolation processing and pixel values of the pixels included in each frame of event signal obtained through interpolation processing. Then, target pixel values of pixels at a same location in the at least one frame of event signal obtained through interpolation processing are accumulated, to obtain the frame of event signal obtained through format conversion.

In other words, interpolation processing is performed on the at least one frame of event signal, so that the at least one frame of event signal includes more pixels. In this way, when a target pixel value of any pixel in each frame of event signal is determined, there is no need to consider a pixel value of another pixel adjacent to the pixel in a space dimension, so that signal processing efficiency can be improved.

The frame of event signal obtained through format conversion in the foregoing manner 1 is an event signal in the voxel grid format. In other words, when the first event signal is an event signal in a frame format, according to the method provided in the foregoing manner 1, a product of the accumulated value of the event polarities corresponding to the pixels and a weight of the first event signal in a time dimension is used as pixel values of the pixels obtained through conversion, to obtain a frame of event signal in the voxel grid format.

Manner 2: Space-dimension format conversion is performed on the at least one frame of event signal included in the target group of event signals, to obtain a frame of event signal obtained through format conversion.

Pixel values, in a space dimension, of pixels included in each of the at least one frame of event signal is determined. Pixel values, in a space dimension, of pixels at a same location in the at least one frame of event signal are accumulated, to obtain the frame of event signal obtained through format conversion.

It should be noted that, that the at least one frame of event signal is successively traversed according to the foregoing method to obtain pixel values of pixels in the frame of event signal obtained through format conversion is merely an example. Optionally, the pixel values of the pixels in the frame of event signal obtained through format conversion can alternatively be determined in another manner. For example, interpolation processing is performed on each of the at least one frame of event signal, to obtain at least one frame of event signal obtained through interpolation processing. Pixel values of pixels at a same location in the at least one frame of event signal obtained through interpolation processing are accumulated, to obtain the frame of event signal obtained through format conversion.

In other words, interpolation processing is performed on the at least one frame of event signal, so that the at least one frame of event signal includes more pixels. In this way, there is no need to determine a pixel value of any pixel in each frame of event signal in a space dimension, in other words, there is no need to consider a pixel value of another pixel adjacent to the pixel in a space dimension, so that signal processing efficiency can be improved.

The frame of event signal obtained through format conversion in the foregoing manner 2 is an event signal in the event frame format. In other words, when the first event signal is an event signal in a frame format, according to the method provided in the foregoing manner 2, the accumulated value of the event polarities corresponding to the pixels is used as the pixel values of the pixels obtained through conversion, to obtain a frame of event signal in the event frame format. Certainly, in an actual application, a total quantity of event polarities corresponding to pixels can be further used as the pixel values of the pixels obtained through conversion, to obtain the frame of event signal in the event frame format. This is not limited in embodiments of the present disclosure.

Because the event frame format is simpler than the voxel grid format, when the first event signal is converted into the second event signal in the event frame format, signal processing efficiency can be improved.

Manner 3: Time-dimension format conversion is performed on the at least one frame of event signal included in the target group of event signals, to obtain a frame of event signal obtained through format conversion.

For the pixels at a same location in the at least one frame of event signal, if a luminance change of the pixel is recorded in each of the at least one frame of event signal, a largest frame sequence number in a frame sequence number of the at least one frame of event signal is determined as a target pixel value of the pixel. If the luminance change of the pixel is recorded in some frames of event signals in the at least one frame of event signal, a largest frame sequence number in frame sequence numbers of the some frames of event signals is determined as the target pixel value of the pixel. If no luminance change of the pixel is recorded in the at least one frame of event signal, it is determined that the target pixel value of the pixel is 0. The frame of event signal obtained through format conversion is formed by using the target pixel values of the pixels.

It should be noted that, for any pixel in the at least one frame of event signal, according to the foregoing method, an event signal in which the luminance change of the pixel is recorded is directly selected from the at least one frame of event signal, and a largest frame sequence number in frame sequence numbers of the selected event signals is determined as the target pixel value of the pixel. Alternatively, it is determined that the target pixel value of the pixel is 0 when no luminance change of the pixel is recorded in the at least one frame of event signal. This is merely an example.

Optionally, the pixel values of the pixels in the frame of event signal obtained through format conversion can alternatively be determined in another manner. For example, the at least one frame of event signal is sorted in ascending order of frame sequence numbers, to obtain a sorting result of the at least one frame of event signal. The target pixel values of the pixels are determined based on the sorting result and pixel values of pixels included in each of the at least one frame of event signal.

The frame of event signal obtained through format conversion in the foregoing manner 3 is an event signal in the time plane format. In other words, when the first event signal is an event signal in a frame format, according to the method provided in the foregoing manner 3, a largest frame sequence number of an event signal, in the at least one frame of event signal, in which luminance changes of the pixels are recorded is used as the target pixel values of the pixels, to obtain a frame of event signal in the time plane format.

Manner 4: Based on the image signal, time-dimension and space-dimension format conversion is performed on the at least one frame of event signal included in the target group of event signals, to obtain a frame of event signal obtained through format conversion.

Each of the at least one frame of event signal is split based on an event polarity, to obtain at least one frame of positive event signal and at least one frame of negative event signal. Pixel values, in a space dimension, of pixels included in each of the at least one frame of positive event signal, and pixel values, in a space dimension, of pixels included in each of the at least one frame of negative event signal are determined. Target pixels value of the pixels included in each frame of positive event signal are determined based on the pixel values, in a space dimension, of the pixels included in each of the at least one frame of positive event signal and a positive variation threshold. Target pixels value of the pixels included in each frame of negative event signal are determined based on the pixel values, in a space dimension, of the pixels included in each of the at least one frame of negative event signal and a negative variation threshold. The frame of event signal obtained through format conversion is determined based on the target pixel values of the pixels included in each of the at least one frame of positive event signal, the target pixel values of the pixels included in each of the at least one frame of negative event signal, and the image signal.

According to the method provided in the foregoing manner 4, format conversion is performed on the first event signal based on the obtained image signal, so that the converted second event signal can more accurately indicate luminance information of the pixel at different moments within the exposure time period.

In a second case, the first event signal is the event signal in the stream format, the first event signal includes event signals at H moments, the H moments are within the exposure time period, the second event signal includes N frames of event signals, and both H and N are integers greater than or equal to 1. In this case, the exposure time period is divided into N sub-periods, and each of the N sub-periods includes an event signal at at least one of the H moments. Time-dimension and/or space-dimension format conversion are and/or is performed on the event signal included in each of the N sub-periods, to obtain the N frames of event signals.

Because manners of performing time-dimension and/or space-dimension format conversion on event signals included in each of the N sub-periods are the same, a sub-period is selected from the N sub-periods as a target sub-period. The following uses the target sub-period as an example to separately describe manners of performing format conversion on an event signal at at least one moment included in the target sub-period in different manners.

Manner 1: Time-dimension and space-dimension format conversion is performed on the event signal at the at least one moment included in the target sub-period, to obtain a frame of event signal obtained through format conversion.

A weight of an event signal at each of the at least one moment in a time dimension is determined. Event polarities of pixels included in the event signal at each of the at least one moment are determined. Target pixel values of the pixels included in the event signal at each moment are determined based on the weight of the event signal at each of the at least one moment in a time dimension and the event polarities of the pixels included in the event signal at each moment. Then, target pixel values of pixels at a same location in the event signal at the at least one moment are accumulated, to obtain the frame of event signal obtained through format conversion.

The frame of event signal obtained through format conversion in the foregoing manner 1 is an event signal in the voxel grid format. In other words, when the first event signal is an event signal in a stream format, according to the method provided in the foregoing manner 1, a product of the accumulated value of the event polarities corresponding to the pixels and a weight of the first event signal in a time dimension is used as pixel values of the pixels obtained through conversion, to obtain a frame of event signal in the voxel grid format obtained through format conversion.

Manner 2: Space-dimension format conversion is performed on the event signal at the at least one moment included in the target sub-period, to obtain a frame of event signal obtained through format conversion.

Event polarities of pixels included in the event signal at each of the at least one moment are determined. Event polarities of the pixels at a same location in the event signal at the at least one moment are accumulated, to obtain the frame of event signal obtained through format conversion.

The frame of event signal obtained through format conversion in the foregoing manner 2 is an event signal in the event frame format. In other words, when the first event signal is an event signal in a stream format, according to the method provided in the foregoing manner 2, the accumulated value of the event polarities corresponding to the pixels is used as the pixel values of the pixels obtained through conversion, to obtain a frame of event signal in the event frame format obtained through format conversion. Certainly, in an actual application, a total quantity of event polarities corresponding to pixels can be further used as pixel values of converted pixels, to obtain the frame of event signal in the event frame format obtained through format conversion. This is not limited in embodiments of the present disclosure.

Manner 3: Time-dimension format conversion is performed on the event signal at the at least one moment included in the target sub-period, to obtain a frame of event signal obtained through format conversion.

For the pixels at a same location in the event signal at the at least one moment, spatial location coordinates of the pixel obtained through conversion are determined from a correspondence between spatial location coordinates before conversion and spatial location coordinates after conversion based on spatial location coordinates of the pixel in the event signal at each moment. If luminance changes of the pixels are recorded in event signals at all moments in the event signal at the at least one moment, a largest timestamp in timestamps of the event signal at the at least one moment is determined as a pixel value on the spatial location coordinates of the pixel obtained through conversion. If luminance changes of the pixels are recorded in event signals at some moments in the event signal at the at least one moment, a largest timestamp in timestamps of the event signals at some moments is determined as a pixel value on the spatial location coordinates of the pixel obtained through conversion. The frame of event signal obtained through format conversion is formed by using the pixel value on the spatial location coordinates of the pixel obtained through conversion.

It should be noted that, for any pixel in the event signal at the at least one moment, according to the foregoing method, the event signals in which the luminance changes of the pixels are recorded are directly selected from the event signal at the at least one moment, and a largest timestamp in timestamps of the selected event signals is determined as the pixel value on the spatial location coordinates of the pixel obtained through conversion. This is merely an example. Optionally, the pixel values of the pixels in the frame of event signal obtained through format conversion can alternatively be determined in another manner. For example, the event signal at the at least one moment is sorted in ascending order of timestamps, to obtain a sorting result of the event signal at the at least one moment. Spatial location coordinates of pixels in the frame of event signal obtained through format conversion are determined based on the spatial location coordinates of pixels in the event signal at the at least one moment. The pixel values of the pixels obtained through conversion are determined based on the sorting result and a timestamp of the event signal at each of the at least one moment.

The frame of event signal obtained through format conversion in the foregoing manner 3 is an event signal in the time plane format. In other words, when the first event signal is an event signal in a stream format, according to the method provided in the foregoing manner 3, a timestamp corresponding to a polarity event that last occurs on the pixels is used as target pixel values corresponding to the pixels, to obtain a frame of event signal in the time plane format obtained through format conversion.

Manner 4: Based on the image signal, time-dimension and space-dimension format conversion is performed on the event signal at the at least one moment included in the target sub-period, to obtain a frame of event signal obtained through format conversion.

Event polarities of pixels included in the event signal at each of the at least one moment are determined. Positive polarity values of the pixels included in the event signal at each moment are determined based on the event polarities of the pixels included in the event signal at each of the at least one moment and a positive variation threshold. Negative polarity values of the pixels included in the event signal at each moment are determined based on the event polarities of the pixels included in the event signal at each of the at least one moment and a negative variation threshold. The frame of event signal obtained through format conversion is determined based on the positive polarity values of the pixels included in the event signal at each of the at least one moment, the negative polarity values of the pixels included in the event signal at each of the at least one moment, and the image signal.

According to the method provided in the foregoing manner 4, format conversion is performed on the first event signal based on the obtained image signal, so that the converted second event signal can more accurately indicate luminance information of the pixel at different moments within the exposure time period.

The following operations are performed on each of the N frames of event signals: determining a mask area in a frame of event signal, where the mask area indicates an area in which a pixel having motion information in the corresponding frame of event signal is located; and fusing pixel values of pixels located in the mask area and pixel values of corresponding pixels in the image signal, and setting pixel values of pixels located outside the mask area to the pixel values of the corresponding pixels in the image signal, to obtain a frame of fused signal.

In other words, pixels outside the mask area are shielded by using a mask area corresponding to each of the N frames of event signals, and there is no need to perform fusion of the event signal and the image signal on the pixels outside the mask area.

Optionally, the target scene is an autonomous driving scenario. After the fused signal is obtained based on the foregoing steps, the fused signal is input into a neural network model, to obtain scenario awareness information of the autonomous driving scenario.

According to a second aspect, a signal processing method is provided. In the method, a cloud server receives an image signal and a first event signal that are of a target scene and that are sent by a signal processing device, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format. The cloud server performs time-dimension and/or space-dimension format conversion on the first event signal, to obtain a second event signal, where the second event signal is an event signal in a frame format, and resolution of the second event signal is the same as resolution of the image signal. The second event signal and the image signal are fused, to obtain a fused signal. The cloud server sends the fused signal to the signal processing device.

The first event signal includes the event signal in the frame format and the event signal in the stream format. In different cases, manners of performing time-dimension and/or space-dimension format conversion on the first event signal to obtain the second event signal are different. The following two cases are separately described.

In a first case, the first event signal is the event signal in the frame format, the first event signal includes M frames of event signals, the second event signal includes N frames of event signals, both M and N are integers greater than or equal to 1, and M is greater than or equal to N. In this case, the M frames of event signals are grouped into N groups of event signals based on frame sequence numbers, and each of the N groups of event signals includes at least one frame of event signal with consecutive frame sequence numbers. Time-dimension and/or space-dimension format conversion are and/or is performed on each of the N groups of event signals, to obtain the N frames of event signals.

In a second case, the first event signal is the event signal in the stream format, the first event signal includes event signals at H moments, the H moments are within the exposure time period, the second event signal includes N frames of event signals, and both H and N are integers greater than or equal to 1. In this case, the exposure time period is divided into N sub-periods, and each of the N sub-periods includes an event signal at at least one of the H moments. Time-dimension and/or space-dimension format conversion are and/or is performed on the event signal included in each of the N sub-periods, to obtain the N frames of event signals.

The following operations are performed on each of the N frames of event signals: determining a mask area in a frame of event signal, where the mask area indicates an area in which a pixel having motion information in the corresponding frame of event signal is located; and fusing pixel values of pixels located in the mask area and pixel values of corresponding pixels in the image signal, and setting pixel values of pixels located outside the mask area to the pixel values of the corresponding pixels in the image signal, to obtain a frame of fused signal.

According to a third aspect, a signal processing apparatus is provided. The signal processing apparatus has a function of implementing behavior of the signal processing method in the first aspect. The signal processing apparatus includes at least one module, and the at least one module is configured to implement the signal processing method provided in the first aspect.

According to a fourth aspect, a cloud server is provided. The cloud server includes a communication interface and one or more processors.

The communication interface is configured to receive an image signal and a first event signal that are of a target scene and that are sent by a signal processing device, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format.

The one or more processors are configured to perform time-dimension and/or space-dimension format conversion on the first event signal, to obtain a second event signal, where the second event signal is an event signal in a frame format, and resolution of the second event signal is the same as resolution of the image signal.

The one or more processors are configured to fuse the second event signal and the image signal, to obtain a fused signal.

The one or more processors are configured to send the fused signal to the signal processing device through the communication interface.

According to a fifth aspect, a signal processing system is provided. The signal processing system includes a signal processing device and a cloud server, the signal processing device is configured to send an image signal and a first event signal that are of a target scene to the cloud server, and the cloud server is configured to implement the signal processing method provided in the second aspect.

According to a sixth aspect, a signal processing device is provided. The signal processing device includes a processor and a memory, and the memory is configured to store a computer program for performing the signal processing method provided in the first aspect. The processor is configured to execute the computer program stored in the memory, to implement the signal processing method according to the first aspect.

Optionally, the signal processing device may further include a communication bus, and the communication bus is configured to establish a connection between the processor and the memory.

According to a seventh aspect, a computer-readable storage medium is provided. The storage medium stores instructions, and when the instructions are run on a computer, the computer is enabled to perform steps of the signal processing method according to the first aspect or the second aspect.

According to an eighth aspect, a computer program product including instructions is provided. When the instructions are run on a computer, the computer is enabled to perform steps of the signal processing method according to the first aspect or the second aspect. Alternatively, a computer program is provided. When the computer program is run on a computer, the computer is enabled to perform steps of the signal processing method according to the first aspect or the second aspect.

Technical effects achieved in the second aspect to the eighth aspect are similar to technical effects achieved by corresponding technical means in the first aspect.

DESCRIPTION OF EMBODIMENTS

Figure 1:
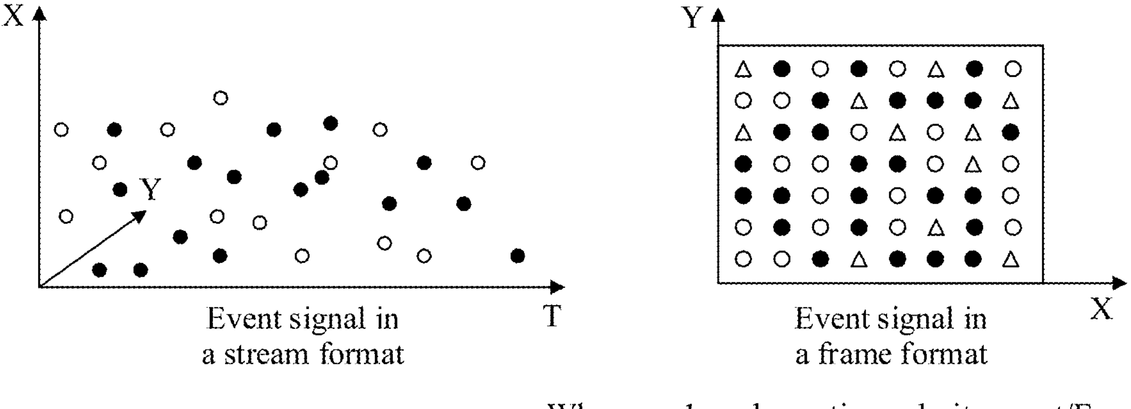
FIG. 1 is a diagram of a first event signal according to an embodiment of the present disclosure.

To make objectives, technical solutions, and advantages of embodiments of the present disclosure clearer, the following further describes implementations of the present disclosure in detail with reference to the accompanying drawings.

Before a signal processing method provided in embodiments of the present disclosure is described in detail, terms, a service scenario, and a system architecture in embodiments of the present disclosure are first described.

For ease of understanding, the terms in embodiments of the present disclosure are first described.

Image sensor: The image sensor can perform signal collection on a target scene, to obtain an image signal in the target scene. In other words, an optical signal can be converted into an electrical signal by using the image sensor, and the electrical signal may be a digital signal.

Currently, two types of image sensors widely used are a charge-coupled device (CCD) image sensor and a complementary metal-oxide-semiconductor (CMOS) image sensor. The CMOS image sensor includes two shutter modes: a rolling shutter mode and a global shutter mode.

DVS: The DVS can independently perceive a luminance change of each of a plurality of pixels corresponding to the target scene, and output, for a pixel whose luminance change exceeds a change threshold, spatial location coordinates of the pixel, a current timestamp, and luminance change information of the pixel, to obtain an event signal in the target scene.

Event signal in a stream format: The event signal in the stream format is a set of four-dimensional arrays in a form of (x, y, t, p). Herein, x and y are positive integers, and represent spatial location coordinates of a pixel; t is a positive real number, and represents a timestamp at which luminance of the pixel changes; and p represents a polarity of a luminance change. When p=−1, it indicates that luminance corresponding to the pixel decreases, in other words, a negative polarity event occurs on the pixel. When p=1, it indicates that luminance corresponding to the pixel increases, in other words, a positive polarity event occurs on the pixel.

Event signal in a frame format: The event signal in the frame format is a two-dimensional array obtained by projecting locations of pixels whose luminance changes in a period of time to a same two-dimensional plane. A value of a location of any pixel in the two-dimensional array may be represented as $E(x, y, M_i)$. Herein, x and y are positive integers, and represent spatial location coordinates of the pixel; and $M_i$ is a positive integer, and represents a frame sequence number of an event signal. For example, a value range of $E(x, y, M_i)$ is {−1, 0, 1}. When $E(x, y, M_i)=-1$, it indicates that luminance corresponding to a pixel at a location (x, y) in an event signal whose frame sequence number is $M_i$ decreases, in other words, a negative polarity event occurs on the pixel. When $E(x, y, M_i)=1$, it indicates that luminance corresponding to a pixel at a location (x, y) in an event signal whose frame sequence number is $M_i$ increases, in other words, a positive polarity event occurs on the pixel. When $E(x, y, M_i)=0$, it indicates that luminance corresponding to a pixel at a location (x, y) in an event signal whose frame sequence number is $M_i$ does not change, in other words, no event occurs on the pixel.

FIG. 1 is a diagram of a first event signal according to an embodiment of the present disclosure. In FIG. 1, a left figure shows an event signal in a stream format within a period of time, and a right figure shows a frame of event signal in a frame format. A black dot indicates that a negative polarity event occurs on a pixel, a white dot indicates that a positive polarity event occurs on a pixel, and a white triangle indicates that no event occurs on a pixel.

Coupled sensor: The coupled sensor is a novel sensor formed by coupling a DVS and an image sensor. Signal collection is performed on a target scene by using the coupled sensor, so that an image signal and an event signal that are of the target scene can be obtained.

Then, a service scenario and a system architecture in embodiments of the present disclosure are described.

The signal processing method provided in embodiments of the present disclosure can be applied to a plurality of scenarios, for example, scenarios of autonomous driving, terminal device imaging, and target object monitoring.

Figure 2:
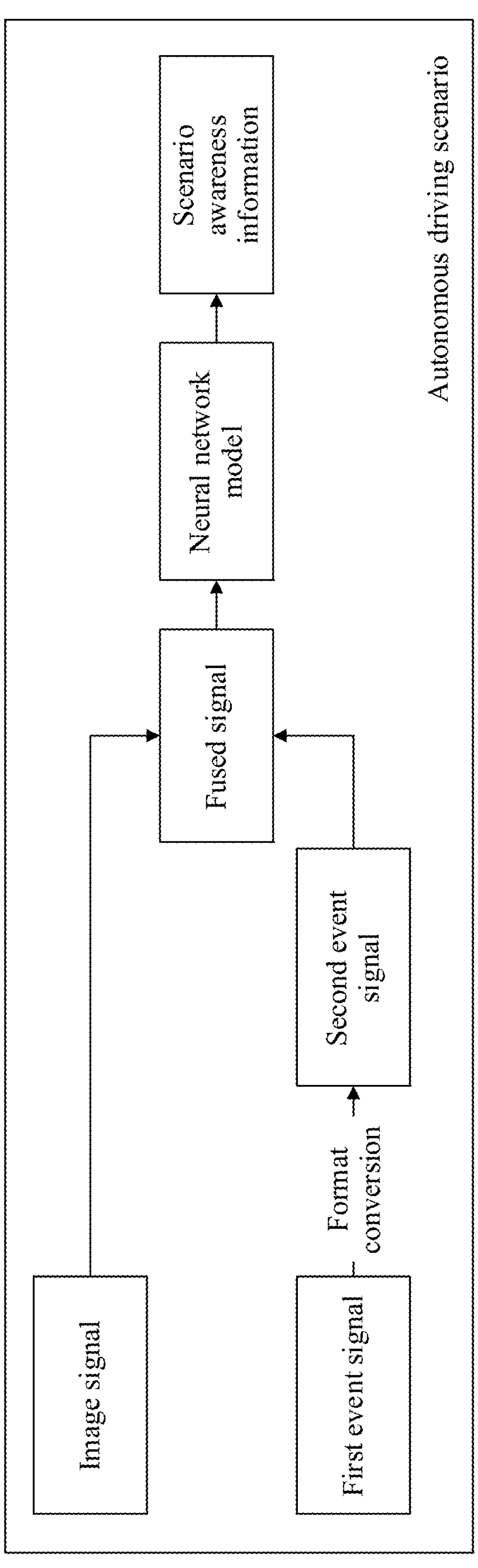
FIG. 2 is a diagram of an application scenario according to an embodiment of the present disclosure.

FIG. 2 is a diagram of an application scenario according to an embodiment of the present disclosure. In FIG. 2, when a vehicle-mounted perception device includes a DVS and an image sensor, the vehicle-mounted perception device obtains an image signal in a target scene by using the image sensor, and obtains a first event signal in the target scene by using the DVS. Then, according to the method provided in this embodiment of the present disclosure, format conversion is performed on the first event signal, to obtain a second event signal, and the second event signal and the image signal are fused, to obtain a fused signal. Finally, the fused signal is input into a neural network model to obtain scenario awareness information, to perceive information about a road condition, a vehicle, a pedestrian, an environment change, and the like in the autonomous driving scenario.

Figure 3:
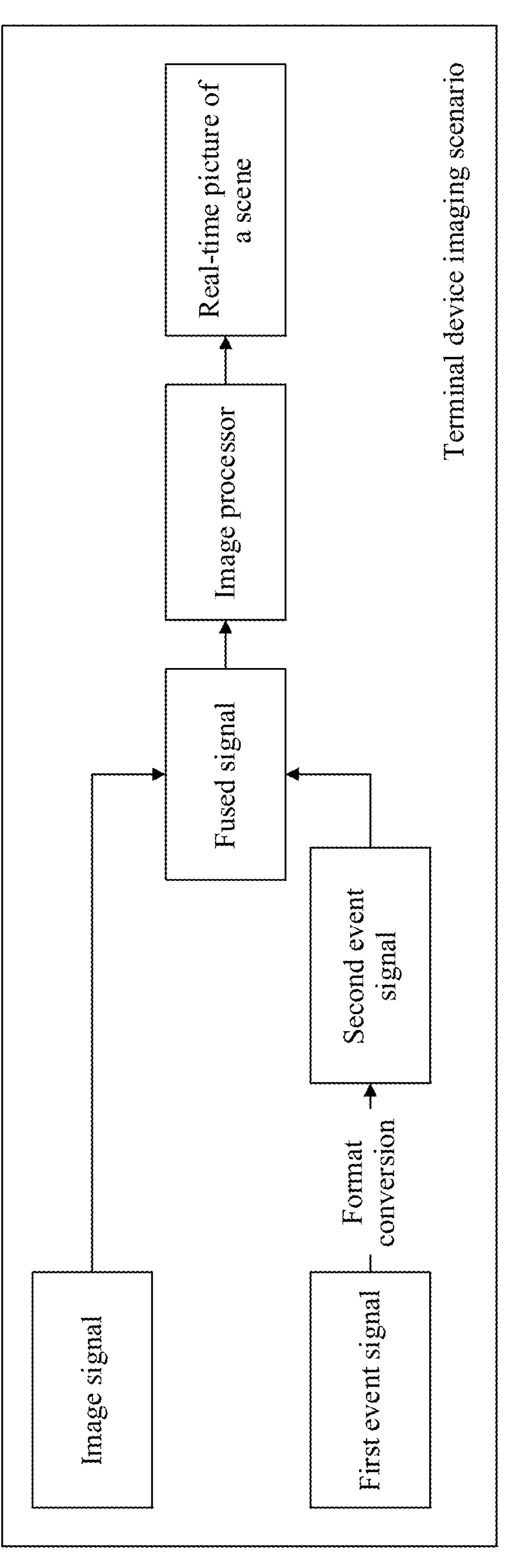
FIG. 3 is a diagram of another application scenario according to an embodiment of the present disclosure.

FIG. 3 is a diagram of another application scenario according to an embodiment of the present disclosure. In FIG. 3, if a coupled sensor is equipped for a terminal device like a personal computer (PC), a mobile phone, a smartphone, a personal digital assistant (PDA), a pocket personal computer (PPC), or a tablet computer, the terminal device obtains both an image signal and a first event signal that are of a target scene by using the coupled sensor, performs format conversion on the first event signal according to the method provided in embodiments of the present disclosure, to obtain a second event signal, and then fuses the second event signal and the image signal, to obtain a fused signal. Then, the fused signal is input to an image processor to obtain a real-time picture of the scene.

Figure 4:
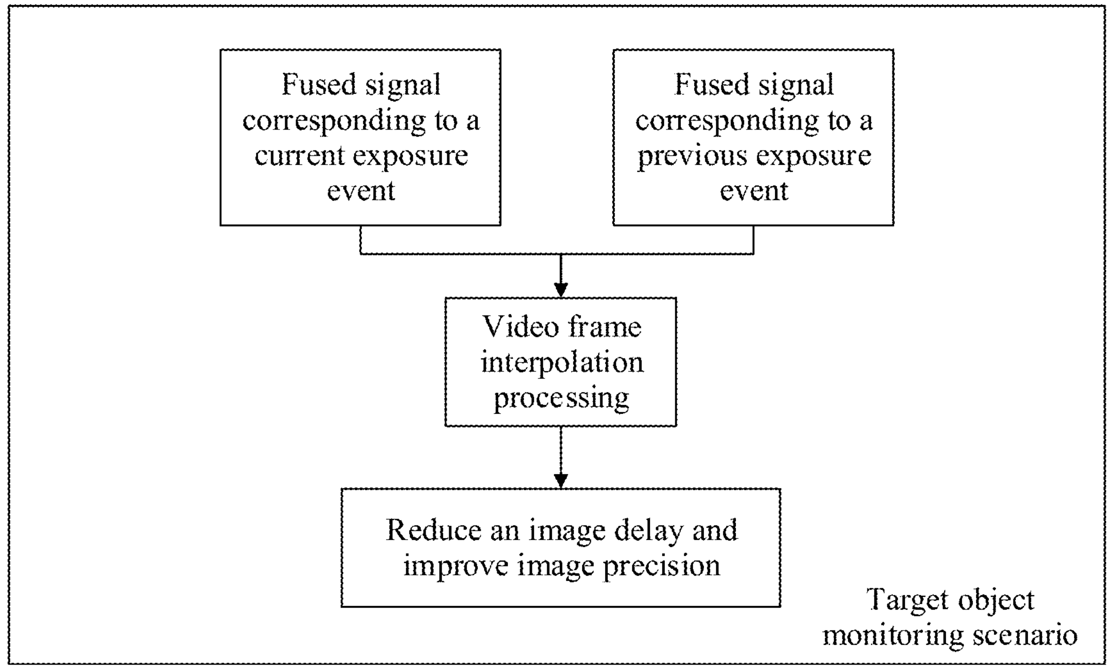
FIG. 4 is a diagram of still another application scenario according to an embodiment of the present disclosure.

FIG. 4 is a diagram of still another application scenario according to an embodiment of the present disclosure. In FIG. 4, in a target object monitoring scenario, an image processing device obtains a fused signal according to the method provided in embodiments of the present disclosure, and the fused signal is a fused signal corresponding to a current exposure time period. Then, video frame interpolation processing is performed based on the fused signal corresponding to the current exposure time period and a fused signal corresponding to a previous exposure time period, to reduce an image delay and improve image precision.

Figure 5:
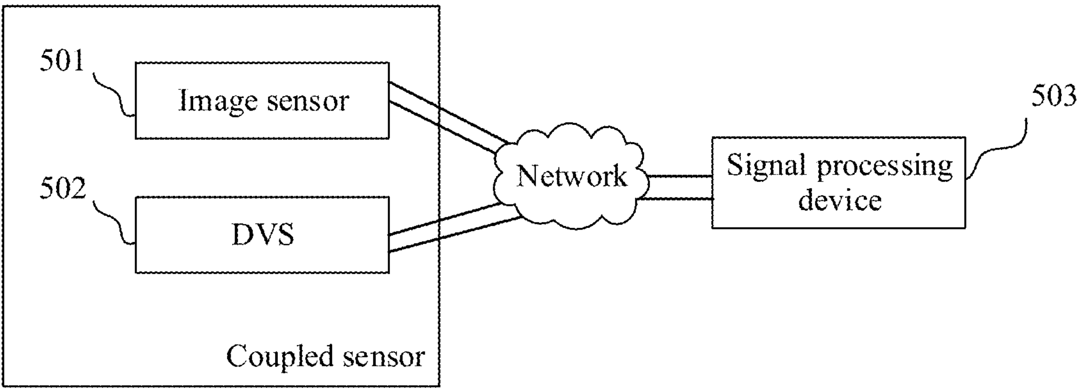
FIG. 5 is a diagram of an architecture of a signal processing system according to an embodiment of the present disclosure.

FIG. 5 is a diagram of an architecture of a signal processing system according to an embodiment of the present disclosure. The system includes an image sensor 501, a DVS 502, and a signal processing device 503. The image sensor 501 and the DVS 502 form a coupled sensor. The image sensor 501 and the DVS 502 may be other devices independent of the signal processing device 503, in other words, the image sensor 501, the DVS 502, and the signal processing device 503 are respectively three independent devices. Alternatively, the image sensor 501 and the DVS 502 are integrated into the signal processing device 503, in other words, the image sensor 501, the DVS 502, and the signal processing device 503 are used as an entire device. This is not limited in embodiments of the present disclosure.

Figure 6:
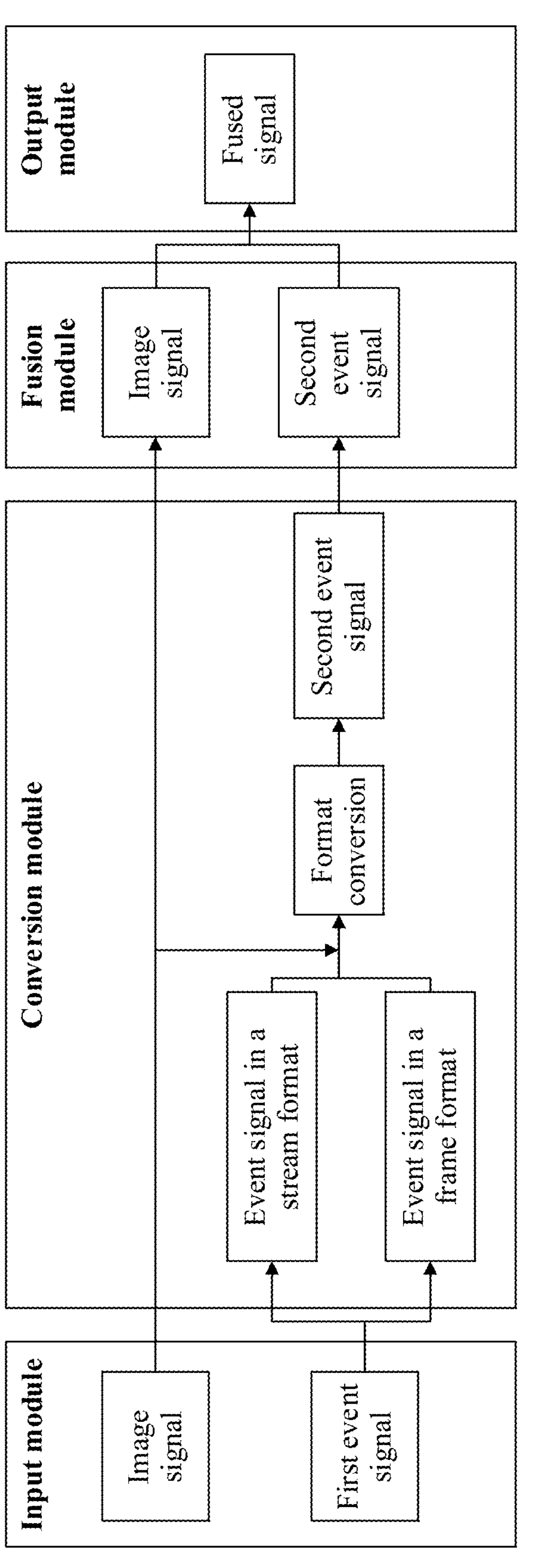
FIG. 6 is a diagram of a signal processing device according to an embodiment of the present disclosure.

The image sensor 501 is configured to output an image signal in a target scene. The DVS 502 is configured to output a first event signal in the target scene. FIG. 6 is a diagram of a signal processing device according to an embodiment of the present disclosure. The signal processing device includes an input module, a conversion module, a fusion module, and an output module. The input module is configured to input the image signal and the first event signal that are of the target scene, where the first event signal is an event signal in a stream format or an event signal in a frame format. The conversion module is configured to perform format conversion on the first event signal, to obtain a second event signal. The fusion module is configured to fuse the second event signal and the image signal, to obtain a fused signal. The output module is configured to output the fused signal.

It should be noted that the input module, the conversion module, the fusion module, and the output module mentioned above may all be deployed on the signal processing device. Certainly, alternatively, the input module may be deployed on the signal processing device, and the conversion module, the fusion module, and the output module are all deployed on the cloud server.

Optionally, to maximize utilization of algorithm efficiency, the input module, the conversion module, the fusion module, and the output module are preferentially deployed on a chip to perform algorithm hardening. For a chip on which algorithm hardening is not performed, related software may alternatively be developed in an operating system.

A person skilled in the art should understand that the foregoing signal processing device is merely an example. If another existing or possible future signal processing device is applicable to embodiments of the present disclosure, the signal processing device should also fall within the protection scope of embodiments of the present disclosure, and is included herein by reference.

It should be noted that the service scene and the system architecture described in embodiments of the present disclosure are intended to describe the technical solutions in embodiments of the present disclosure more clearly, but constitute no limitation on the technical solutions provided in embodiments of the present disclosure. A person of ordinary skill in the art may learn that, with emergence of a new service scene and evolution of the system architecture, the technical solutions provided in embodiments of the present disclosure are also applicable to a similar technical problem.

Figure 7:
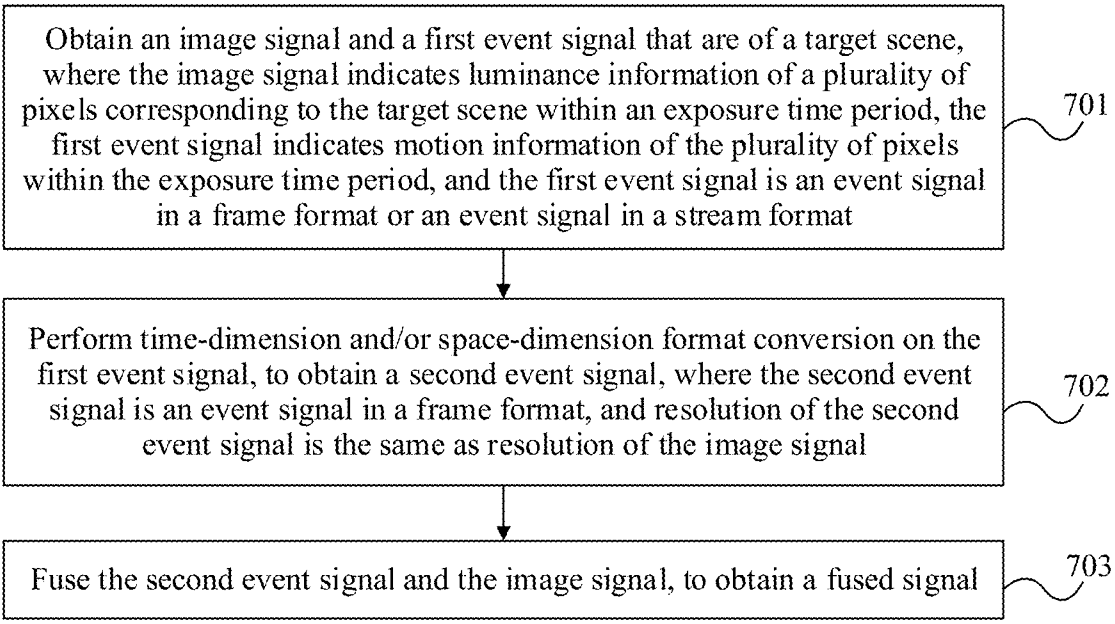
FIG. 7 is a flowchart of a signal processing method according to an embodiment of the present disclosure.

FIG. 7 is a flowchart of a signal processing method according to an embodiment of the present disclosure. The signal processing method provided in this embodiment of the present disclosure is executed by a signal processing device. The signal processing device includes any one of the foregoing vehicle-mounted perception device, terminal device, and image processing device. Refer to FIG. 7. The method includes the following steps.

Step 701: Obtain an image signal and a first event signal that are of a target scene, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format.

Based on the foregoing description, the image signal in the target scene is obtained by using an image sensor, and the first event signal in the target scene is obtained by using a DVS. Alternatively, the image signal and the first event signal that are of the target scene are obtained by using a coupled sensor. Certainly, in an actual application, the image signal and the first event signal that are of the target scene may be alternatively obtained in another manner. This is not limited in embodiments of the present disclosure. The exposure time period is an exposure time period of the image sensor.

For each pixel in the plurality of pixels corresponding to the target scene, luminance information of each pixel within the exposure time period is processed according to a related algorithm, to obtain a frame of image signal in the target scene.

The first event signal includes the event signal in the stream format and the event signal in the frame format. The event signal in the stream format includes event signals at H moments within the exposure time period. For an event signal at any one of the H moments, pixel values of pixels in the event signal at the moment are event polarities corresponding to the pixels at the moment. The event signal in the frame format includes M frames of event signals within the exposure time period. For any frame of event signal in the M frames of event signals, pixel values of pixels in the frame of event signal are event polarities corresponding to the pixels within a period of time.

Step 702: Perform time-dimension and/or space-dimension format conversion on the first event signal, to obtain a second event signal, where the second event signal is an event signal in a frame format, and resolution of the second event signal is the same as resolution of the image signal.

A format of the second event signal is any one of an event frame format, a time plane format, and a voxel grid format. An event signal in the event frame format is a frame of event signal that includes an accumulated value of event polarities corresponding to pixels in a period of time or a total quantity of event polarities. An event signal in the time plane format is a frame of event signal that includes a largest timestamp corresponding to a polarity event that occurs on pixels in a period of time. An event signal in the voxel grid format is a frame of event signal that includes a product of an accumulated value of event polarities corresponding to pixels in a period of time and a weight of the event signal in a time dimension.

Based on the foregoing description, the first event signal includes the event signal in the frame format and the event signal in the stream format. In different cases, manners of performing time-dimension and/or space-dimension format conversion on the first event signal to obtain the second event signal are different. The following two cases are separately described.

In a first case, the first event signal is the event signal in the frame format, the first event signal includes M frames of event signals, the second event signal includes N frames of event signals, both M and N are integers greater than or equal to 1, and M is greater than or equal to N. In this case, the M frames of event signals are grouped into N groups of event signals based on frame sequence numbers, and each of the N groups of event signals includes at least one frame of event signal with consecutive frame sequence numbers. Time-dimension and/or space-dimension format conversion are and/or is performed on each of the N groups of event signals, to obtain the N frames of event signals.

In some embodiments, the M frames of event signals are grouped into the N groups of event signals according to the following formula (1):

$$\Delta t = INT(M/N) \tag{1}$$

In the foregoing formula (1), Δt represents an offset in a time dimension, in other words, Δt frames of event signals with consecutive frame sequence numbers in the M frames of event signals are used as a group of event signals; N represents a total quantity of converted event signals, and is usually preset; and $$INT(M/N)$$

represents a round-down function.

It should be noted that, that the M frames of event signals are grouped into the N groups of event signals according to the foregoing formula (1) is merely an example. In some other embodiments, the M frames of event signals can be further grouped into the N groups of event signals in another manner. For example, the total quantity (that is, N) of converted event signals is preset, in other words, a frame sequence number of a converted event signal is known, and the signal processing device stores a correspondence between the frame sequence number of the converted event signal and the offset Δt in a time dimension. In this way, when the M frames of event signals are grouped into the N groups of event signals based on the frame sequence numbers, an offset Δt, in a time dimension, corresponding to each frame sequence number is obtained from the correspondence between the frame sequence number and the offset Δt in a time dimension, and the Δt frames of event signals with consecutive frame sequence numbers in the M frames of event signals are used as a group of event signals based on the offset Δt, in a time dimension, corresponding to each frame sequence number.

It is assumed that a total quantity of M frames of event signals is 20, in other words, M=20, and a preset total quantity of converted event signals is 4, in other words, N=4. A correspondence between a frame sequence number $N_i$ and an offset $\Delta t_i$ in a time dimension that is stored in the signal processing device is shown in Table 1. In this case, based on the correspondence between the frame sequence number $N_i$ and the offset $\Delta t_i$ in a time dimension, four frames of event signals whose frame sequence numbers are 1 to 4 in the 20 frames of obtained event signals are grouped into a group of event signals, eight frames of event signals whose frame sequence numbers are 5 to 12 are grouped into a group of event signals, six frames of event signals whose frame sequence numbers are 13 to 18 are grouped into a group of event signals, and two frames of event signals whose frame sequence numbers are 19 and 20 are grouped into a group of event signals, to obtain four groups of event signals.

TABLE 1

| Frame sequence number $N_i$ | Offset $\Delta t_i$ in a time dimension |
|---|---|
| $N_i = 1$ | $\Delta t_i = 4$ |
| $N_i = 2$ | $\Delta t_i = 8$ |
| $N_i = 3$ | $\Delta t_i = 6$ |
| $N_i = 4$ | $\Delta t_i = 2$ |

Because manners of performing time-dimension and/or space-dimension format conversion on all of the N groups of event signals are the same, one group of event signals is selected from the N groups of event signals as a target group of event signals. The following uses the target group of event signals as an example to separately describe different manners of performing format conversion on at least one frame of event signal included in the target group of event signals.

Manner 1: Time-dimension and space-dimension format conversion is performed on the at least one frame of event signal included in the target group of event signals, to obtain a frame of event signal obtained through format conversion.

A weight of each of the at least one frame of event signal in a time dimension is determined. Pixel values, in a space dimension, of pixels included in each of the at least one frame of event signal is determined. Target pixel values of the pixels included in each frame of event signal are determined based on the weight of each of the at least one frame of event signal in a time dimension and the pixel values, in a space dimension, of the pixels included in each frame of event signal. Then, target pixel values of pixels at a same location in the at least one frame of event signal are accumulated, to obtain the frame of event signal obtained through format conversion.

For any pixel in each frame of event signal, a pixel value of the pixel in the frame of event signal and a pixel value of a neighboring pixel in the frame of event signal are accumulated, to obtain a pixel value of the pixel in the frame of event signal in a space dimension. Then, a weight of the frame of event signal in a time dimension is multiplied by the pixel value of the pixel in the frame of event signal in a space dimension, to obtain a target pixel value of the pixel in the frame of event signal, and the at least one frame of event signal is successively traversed, to obtain a target pixel value of the pixel in each frame of event signal. Then, target pixel values of the pixel separately in the at least one frame of event signal are accumulated, to obtain a pixel value of the pixel in the frame of event signal obtained through format conversion. In this way, for pixels in the at least one frame of event signal, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (2):

$$K(u, v, N_i) = \sum_{M_i=N_i}^{N_i+\Delta t}\left(1 - \frac{M_i - N_i}{\Delta t}\right)\sum_{y=v}^{v+\Delta y}\sum_{x=u}^{u+\Delta x} E(x, y, M_i) \tag{2}$$

In the foregoing formula (2), $$K(u, v, N_i)$$

represents a pixel value of a pixel $$(u, v)$$

in the frame of event signal, whose frame sequence number is $$N_i,$$

obtained through format conversion, $$E(x, y, M_i)$$

represents a pixel value of a pixel $$(x, y)$$

in an event signal whose frame sequence number is $$M_i$$

in the at least one frame of event signal, $$\sum_{y=v}^{v+\Delta y}\sum_{x=u}^{u+\Delta x} E(x,\ y,\ M_i)$$

represents a pixel value of the pixel $$(x,\ y)$$

in the event signal whose frame sequence number is $$M_i$$

in a space dimension, $$\left(1-\frac{M_i-N_i}{\Delta t}\right)$$

represents a weight of the event signal whose frame sequence number is $$M_i$$

in a time dimension, $$\Delta x$$

represents an offset in a space dimension in an X-axis direction, and $$\Delta y$$

represents an offset in a space dimension in a Y-axis direction, and is usually preset.

It should be noted that, that the at least one frame of event signal is successively traversed according to the foregoing method to obtain pixel values of pixels in the frame of event signal obtained through format conversion is merely an example. In some other embodiments, the pixel values of the pixels in the frame of event signal obtained through format conversion can alternatively be determined in another manner. For example, interpolation processing is performed on each of the at least one frame of event signal, to obtain at least one frame of event signal obtained through interpolation processing. A weight, in a time dimension, of each frame of event signal obtained through interpolation processing in the at least one frame of event signal obtained through interpolation processing is determined. Target pixel values of pixels included in each frame of event signal obtained through interpolation processing are determined based on the weight, in a time dimension, of each frame of event signal obtained through interpolation processing in the at least one frame of event signal obtained through interpolation processing and pixel values of the pixels included in each frame of event signal obtained through interpolation processing. Then, target pixel values of pixels at a same location in the at least one frame of event signal obtained through interpolation processing are accumulated, to obtain the frame of event signal obtained through format conversion.

For each frame of event signal, interpolation processing is performed on the frame of event signal based on pixel values of every two adjacent pixels in the frame of event signal in a space dimension, to obtain an event signal obtained through interpolation processing. For any pixel in each frame of event signal obtained through interpolation processing, a pixel value of the pixel in the frame of event signal obtained through interpolation processing is multiplied by a weight of the frame of event signal obtained through interpolation processing in a time dimension, to obtain a target pixel value of the pixel in the frame of event signal obtained through interpolation processing, and the at least one frame of event signal obtained through interpolation processing is successively traversed, to obtain a target pixel value of the pixel in each frame of event signal obtained through interpolation processing. Then, corresponding target pixel values of the pixel in the at least one frame of event signal obtained through interpolation processing are accumulated, to obtain the pixel value of the pixel in the frame of event signal obtained through format conversion. In other words, interpolation processing is performed on the at least one frame of event signal, so that the at least one frame of event signal includes more pixels. In this way, when a target pixel value of any pixel in each frame of event signal is determined, there is no need to consider a pixel value of another pixel adjacent to the pixel in a space dimension, so that signal processing efficiency can be improved.

For example, in an actual application, interpolation processing can be performed on an event signal by using a nearest neighbor interpolation method or a bilinear interpolation method. This is not limited in embodiments of the present disclosure.

The frame of event signal obtained through format conversion in the foregoing manner 1 is an event signal in the voxel grid format. In other words, when the first event signal is an event signal in a frame format, according to the method provided in the foregoing manner 1, a product of the accumulated value of the event polarities corresponding to the pixels and a weight of the first event signal in a time dimension is used as pixel values of the pixels obtained through conversion, to obtain a frame of event signal in the voxel grid format.

Manner 2: Space-dimension format conversion is performed on the at least one frame of event signal included in the target group of event signals, to obtain a frame of event signal obtained through format conversion.

Pixel values, in a space dimension, of pixels included in each of the at least one frame of event signal is determined. Pixel values, in a space dimension, of pixels at a same location in the at least one frame of event signal are accumulated, to obtain the frame of event signal obtained through format conversion.

For any pixel in each frame of event signal, a pixel value of the pixel in the frame of event signal and a pixel value of a neighboring pixel in the frame of event signal are accumulated, to obtain a pixel value of the pixel in the frame of event signal in a space dimension, and the at least one frame of event signal is successively traversed, to obtain a pixel value of the pixel in each frame of event signal in a space dimension. Then, pixel values of the pixel in the at least one frame of event signal in a space dimension are accumulated, to obtain a pixel value of the pixel in the frame of event signal obtained through format conversion. In this way, for pixels in the at least one frame of event signal, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (3):

$$K(u, v, N_i) = \sum_{M_i=N_i}^{N_i+\Delta t} \sum_{y=v}^{v+\Delta y} \sum_{x=u}^{u+\Delta x} E(x, y, M_i) \tag{3}$$

In the foregoing formula (3), $$K(u, v, N_i)$$

represents the pixel value of the pixel $$(u, v)$$

in the frame of the event signal, whose frame sequence number is $$N_i,$$

obtained through format conversion.

It should be noted that, that the at least one frame of event signal is successively traversed according to the foregoing method to obtain pixel values of pixels in the frame of event signal obtained through format conversion is merely an example. In some other embodiments, the pixel values of the pixels in the frame of event signal obtained through format conversion can alternatively be determined in another manner. For example, interpolation processing is performed on each of the at least one frame of event signal, to obtain at least one frame of event signal obtained through interpolation processing. Pixel values of pixels at a same location in the at least one frame of event signal obtained through interpolation processing are accumulated, to obtain the frame of event signal obtained through format conversion.

For each frame of event signal, interpolation processing is performed on the frame of event signal based on pixel values of every two adjacent pixels in the frame of event signal in a space dimension, to obtain an event signal obtained through interpolation processing. For any pixel in each frame of event signal obtained through interpolation processing, pixel values of the pixel in the at least one frame of event signal obtained through interpolation processing are accumulated, to obtain the pixel value of the pixel in the frame of event signal obtained through format conversion. In other words, interpolation processing is performed on the at least one frame of event signal, so that the at least one frame of event signal includes more pixels. In this way, there is no need to determine a pixel value of any pixel in each frame of event signal in a space dimension, in other words, there is no need to consider a pixel value of another pixel adjacent to the pixel in a space dimension, so that signal processing efficiency can be improved.

The frame of event signal obtained through format conversion in the foregoing manner 2 is an event signal in the event frame format. In other words, when the first event signal is an event signal in a frame format, according to the method provided in the foregoing manner 2, the accumulated value of the event polarities corresponding to the pixels is used as the pixel values of the pixels obtained through conversion, to obtain a frame of event signal in the event frame format. Certainly, in an actual application, a total quantity of event polarities corresponding to pixels can be further used as the pixel values of the pixels obtained through conversion, to obtain the frame of event signal in the event frame format. This is not limited in embodiments of the present disclosure.

Because the event frame format is simpler than the voxel grid format, when the first event signal is converted into the second event signal in the event frame format, signal processing efficiency can be improved.

Manner 3: Time-dimension format conversion is performed on the at least one frame of event signal included in the target group of event signals, to obtain a frame of event signal obtained through format conversion.

For the pixels at a same location in the at least one frame of event signal, if a luminance change of the pixel is recorded in each of the at least one frame of event signal, a largest frame sequence number in a frame sequence number of the at least one frame of event signal is determined as a target pixel value of the pixel. If the luminance change of the pixel is recorded in some frames of event signals in the at least one frame of event signal, a largest frame sequence number in frame sequence numbers of the some frames of event signals is determined as the target pixel value of the pixel. If no luminance change of the pixel is recorded in the at least one frame of event signal, it is determined that the target pixel value of the pixel is 0. The frame of event signal obtained through format conversion is formed by using the target pixel values of the pixels.

It should be noted that, for any pixel in the at least one frame of event signal, according to the foregoing method, an event signal in which the luminance change of the pixel is recorded is directly selected from the at least one frame of event signal, and a largest frame sequence number in frame sequence numbers of the selected event signals is determined as the target pixel value of the pixel. Alternatively, it is determined that the target pixel value of the pixel is 0 when no luminance change of the pixel is recorded in the at least one frame of event signal. This is merely an example. In some other embodiments, the pixel values of the pixels in the frame of event signal obtained through format conversion can alternatively be determined in another manner. For example, the at least one frame of event signal is sorted in ascending order of frame sequence numbers, to obtain a sorting result of the at least one frame of event signal. The target pixel values of the pixels are determined based on the sorting result and pixel values of pixels included in each of the at least one frame of event signal.

For any pixel in a first frame of event signal in the sorting result, whether a pixel value of the pixel in the first frame of event signal is 0 is determined. When the pixel value of the pixel in the first frame of event signal is not 0, a frame sequence number of the first frame of event signal is determined as a target pixel value of the pixel. When the pixel value of the pixel in the first frame of event signal is 0, it is determined that the target pixel value of the pixel is also 0. In this way, for pixels in the first frame of event signal, target pixel values of the pixels in the first frame of event signal can all be determined based on the foregoing steps. For any pixel in a second frame of event signal in the sorting result, whether a pixel value of the pixel in the second frame of event signal is 0 is determined. When the pixel value of the pixel in the second frame of event signal is not 0, a frame sequence number of the second frame of event signal is updated as a target pixel value of the pixel. When the pixel value of the pixel in the second frame of event signal is 0, it is determined that the target pixel value of the pixel remains unchanged. In this way, for pixels in the second frame of event signal, target pixel values of the pixels in the second frame of event signal can all be determined based on the foregoing steps. Then, the at least one frame of event signal is successively traversed according to a same method, to obtain the frame of event signal obtained through format conversion.

It is assumed that the target group of event signals include three frames of event signals whose frame sequence numbers are 8, 9, and 10. A pixel (1, 1) is used as an example. E(1, 1, 8)=4, E(1, 1, 9)=0, and E(1, 1, 10)=3. In other words, a pixel value of the pixel (1, 1) in the event signal whose frame sequence number is 8 is 4, a pixel value of the pixel (1, 1) in the event signal whose frame sequence number is 9 is 0, and a pixel value of the pixel (1, 1) in the event signal whose frame sequence number is 10 is 3. In this way, after the event signal whose frame sequence number is 8 is traversed, a target pixel value of the pixel (1, 1) is 8. After the event signal whose frame sequence number is 9 is traversed, the target pixel value of the pixel (1, 1) remains unchanged and is still 8. After the event signal whose frame sequence number is 10 is traversed, the target pixel value of the pixel (1, 1) is 10. In this way, it is determined that a pixel value of the pixel (1, 1) in the frame of event signal obtained through format conversion is 10, and the frame of event signal is obtained by performing time-dimension format conversion on the three frames of event signals whose frame sequence numbers are 8, 9, and 10 in the target group of event signals.

The frame of event signal obtained through format conversion in the foregoing manner 3 is an event signal in the time plane format. In other words, when the first event signal is an event signal in a frame format, according to the method provided in the foregoing manner 3, a largest frame sequence number of an event signal, in the at least one frame of event signal, in which luminance changes of the pixels are recorded is used as the target pixel values of the pixels, to obtain a frame of event signal in the time plane format.

Manner 4: Based on the image signal, time-dimension and space-dimension format conversion is performed on the at least one frame of event signal included in the target group of event signals, to obtain a frame of event signal obtained through format conversion.

Each of the at least one frame of event signal is split based on an event polarity, to obtain at least one frame of positive event signal and at least one frame of negative event signal. Pixel values, in a space dimension, of pixels included in each of the at least one frame of positive event signal, and pixel values, in a space dimension, of pixels included in each of the at least one frame of negative event signal are determined. Target pixels value of the pixels included in each frame of positive event signal are determined based on the pixel values, in a space dimension, of the pixels included in each of the at least one frame of positive event signal and a positive variation threshold. Target pixels value of the pixels included in each frame of negative event signal are determined based on the pixel values, in a space dimension, of the pixels included in each of the at least one frame of negative event signal and a negative variation threshold. The frame of event signal obtained through format conversion is determined based on the target pixel values of the pixels included in each of the at least one frame of positive event signal, the target pixel values of the pixels included in each of the at least one frame of negative event signal, and the image signal.

An implementation process of splitting each frame of event signal based on the event polarity, to obtain a frame of positive event signal and a frame of negative event signal includes: for any pixel in the frame of event signal, determining whether a pixel value of the pixel in the frame of event signal is a positive value. When the pixel value of the pixel in the frame of event signal is a positive value, the pixel value of the pixel remains unchanged. When the pixel value of the pixel in the frame of event signal is not a positive value, the pixel value of the pixel is set to 0, to obtain the frame of positive event signal corresponding to the frame of event signal. Similarly, for any pixel in the frame of event signal, whether the pixel value of the pixel in the frame of event signal is a negative value is determined. When the pixel value of the pixel in the frame of event signal is a negative value, the pixel value of the pixel remains unchanged. When the pixel value of the pixel in the frame of event signal is not a negative value, the pixel value of the pixel is set to 0, to obtain the frame of negative event signal corresponding to the frame of event signal.

Figure 8:
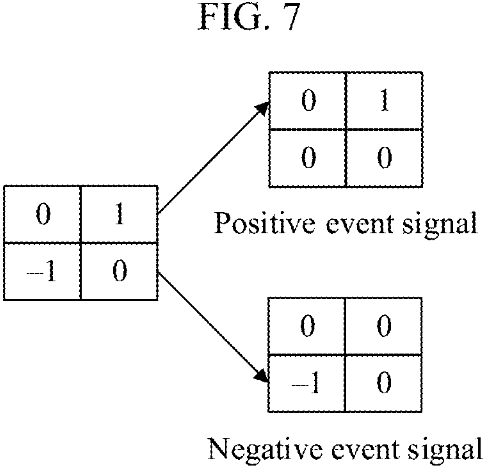
FIG. 8 is a diagram of event signal splitting according to an embodiment of the present disclosure.

For example, FIG. 8 is a diagram of event signal splitting according to an embodiment of the present disclosure. In FIG. 8, a frame of event signal whose frame sequence number is 1 is used as an example. The frame of event signal includes four pixels: the pixel (1, 1), a pixel (1, 2), a pixel (2, 1), and a pixel (2, 2). E(1, 1, 1)=0, E(1, 2, 1)=1, E(2, 1, 1)=−1, and E(2, 2, 1)=0. In other words, a pixel value of the pixel (1, 1) in the frame of event signal is 0, a pixel value of the pixel (1, 2) in the frame of event signal is 1, a pixel value of the pixel (2, 1) in the frame of event signal is −1, and a pixel value of the pixel (2, 2) in the frame of event signal is 0. In this case, the frame of positive event signal and the frame of negative event signal that are obtained by splitting the frame of event signal are shown in FIG. 8.

For any pixel in each frame of positive event signal, a pixel value of the pixel in the frame of positive event signal and a pixel value of a neighboring pixel in the frame of positive event signal are accumulated, to obtain a pixel value of the pixel in the frame of positive event signal in a space dimension. A pixel value of the pixel in the frame of positive event signal in a space dimension is multiplied by the positive variation threshold, to obtain a target pixel value of the pixel in the frame of positive event signal, and the at least one frame of positive event signal is successively traversed, to obtain a target pixel value of the pixel in each frame of positive event signal. Similarly, a target pixel value of the pixel in each frame of negative event signal is determined according to a similar method. Then, a target pixel value of the pixel in the at least one frame of positive event signal and a target pixel value of the pixel in the at least one frame of negative event signal are accumulated, and a calculation result obtained through accumulation is multiplied by a pixel value of the pixel in the image signal, to obtain a pixel value of the pixel in the frame of event signal obtained through format conversion. In this way, for pixels in the at least one frame of event signal, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (4):

$$K(u,\ v,\ N_i) = f\left(\sum_{M_i=N_i}^{N_i+\Delta t} C^+ \sum_{y=v}^{v+\Delta y} \sum_{x=u}^{u+\Delta x} E^+(x,\ y,\ M_i) + C^- \sum_{y=v}^{v+\Delta y} \sum_{x=u}^{u+\Delta x} E^-(x,\ y,\ M_i)\right) \times L(u,\ v) \tag{4}$$

In the foregoing formula (4), $$K(u, v, N_i)$$

represents the pixel value of the pixel $$(u, v)$$

in the frame of event signal, whose frame sequence number is $$N_i,$$

obtained through format conversion, $$E^+(x, y, M_i)$$

represents a pixel value of the pixel $$(x, y)$$

in a positive event signal, whose frame sequence number is $$M_i,$$

in the at least one frame of positive event signal, $$\sum_{y=v}^{v+\Delta y} \sum_{x=u}^{u+\Delta x} E^+(x,\ y,\ M_i)$$

represents a pixel value of the pixel $$(x, y)$$

in the positive event signal whose frame sequence number is $$M_i$$

in a space dimension, $$C^+$$

represents the positive variation threshold, and is usually preset, $$C^+ \sum_{y=v}^{v+\Delta y} \sum_{x=u}^{u+\Delta x} E^+(x,\ y,\ M_i)$$

represents a target pixel value of the pixel $$(x, y)$$

in the positive event signal whose frame sequence number is $$M_i, E^-(x, y, M_i)$$

represents a pixel value of the pixel $$(x, y)$$

in a negative event signal, whose frame sequence number is $$M_i,$$

in the at least one frame of negative event signal, $$\sum_{y=v}^{v+\Delta y} \sum_{x=u}^{u+\Delta x} E^-(x,\ y,\ M_i)$$

represents a pixel value of the pixel $$(x, y)$$

in the negative event signal whose frame sequence number is $$M_i$$

in a space dimension, $$C^-$$

represents the negative variation threshold, and is usually preset, $$C^-\sum_{y=v}^{v+\Delta y}\sum_{x=u}^{u+\Delta x}E^-(x,\ y,\ M_i)$$

represents a target pixel value of the pixel $$(x, y)$$

in the negative event signal whose frame sequence number is $$M_i,$$

$$L(u, v)$$

represents a pixel value of the pixel $$(u, v)$$

in the image signal, and $$f\left(\sum_{M_i=N_i}^{N_i+\Delta t}C^+\sum_{y=v}^{v+\Delta y}\sum_{x=u}^{u+\Delta x}E^+(x,\ y,\ M_i)+C^-\sum_{y=v}^{v+\Delta y}\sum_{x=u}^{u+\Delta x}E^-(x,\ y,\ M_i)\right)$$

represents an exponential function, and is used to convert the calculation result obtained through accumulation from a number domain to a linear domain.

According to the method provided in the foregoing manner 4, format conversion is performed on the first event signal based on the obtained image signal, so that the converted second event signal can more accurately indicate luminance information of the pixel at different moments within the exposure time period.

In a second case, the first event signal is the event signal in the stream format, the first event signal includes event signals at H moments, the H moments are within the exposure time period, the second event signal includes N frames of event signals, and both H and N are integers greater than or equal to 1. In this case, the exposure time period is divided into N sub-periods, and each of the N sub-periods includes an event signal at at least one of the H moments. Time-dimension and/or space-dimension format conversion are and/or is performed on the event signal included in each of the N sub-periods, to obtain the N frames of event signals.

A process of dividing the exposure time period into the N sub-periods is similar to the process of dividing the M frames of event signals into the N groups of event signals based on the frame sequence numbers in the foregoing first case, and therefore, may refer to related content in the foregoing first case.

Because manners of performing time-dimension and/or space-dimension format conversion on event signals included in each of the N sub-periods are the same, a sub-period is selected from the N sub-periods as a target sub-period. The following uses the target sub-period as an example to separately describe manners of performing format conversion on an event signal at at least one moment included in the target sub-period in different manners.

Manner 1: Time-dimension and space-dimension format conversion is performed on the event signal at the at least one moment included in the target sub-period, to obtain a frame of event signal obtained through format conversion.

A weight of an event signal at each of the at least one moment in a time dimension is determined. Event polarities of pixels included in the event signal at each of the at least one moment are determined. Target pixel values of the pixels included in the event signal at each moment are determined based on the weight of the event signal at each of the at least one moment in a time dimension and the event polarities of the pixels included in the event signal at each moment. Then, target pixel values of pixels at a same location in the event signal at the at least one moment are accumulated, to obtain the frame of event signal obtained through format conversion.

For the event signal at each of the at least one moment, the weight of the event signal at the moment in a time dimension is determined based on a timestamp of the event signal at the moment, start time of the target sub-period, and duration of the target sub-period. For any pixel in the event signal at the moment, an event polarity of the pixel in the event signal at the moment is multiplied by a weight of the event signal at the moment in a time dimension, to obtain a target pixel value of the pixel in the event signal at the moment, and the event signal at the at least one moment is successively traversed, to obtain a target pixel value of the pixel in the event signal at each moment. Then, corresponding target pixel values of the pixel in the event signal at the at least one moment are accumulated, to obtain a pixel value of the pixel in the frame of event signal obtained through format conversion. In this way, for pixels in the event signal at the at least one moment, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (5):

$$K(u,\ v,\ N_i)=\sum_{t_{start}<t_j<t_{end}}p_j\delta(u-x_j)\delta(v-y_j)\left(1-\frac{t_j-t_{start}}{t_{end}-t_{start}}\right)\tag{5}$$

In the foregoing formula (5), $$K(u, v, N_i)$$

represents the pixel value of the pixel $$(u, v)$$

in the frame of the event signal, whose frame sequence number is $$N_i,$$

obtained through format conversion, $$t_{start}$$

represents the start time of the target sub-period, $$t_{end}$$

represents end time of the target sub-period, $$t_j$$

represents a timestamp of an event signal at a moment $$t_j$$

in the event signal at the at least one moment, $$\left(1 - \frac{t_j - t_{start}}{t_{end} - t_{start}}\right)$$

represents a weight of the event signal at the moment $$t_j$$

in a time dimension, $$p_j \delta(u - x_j) \delta(v - y_j)$$

represents an event polarity corresponding to the pixel $$(u, v)$$

in the event signal at the moment $$t_j,$$

and $$\delta(u - x_j)$$

and $$\delta(v - y_j)$$

represent indicative functions.

$$\delta(u - x_j)$$

is used as an example for description, $$\delta(u - x_j)$$

is equal to 1 when $$(u - x_j)$$

is 0, and $$\delta(u - x_j)$$

is equal to 0 when $$(u - x_j)$$

is not 0.

The frame of event signal obtained through format conversion in the foregoing manner 1 is an event signal in the voxel grid format. In other words, when the first event signal is an event signal in a stream format, according to the method provided in the foregoing manner 1, a product of the accumulated value of the event polarities corresponding to the pixels and a weight of the first event signal in a time dimension is used as pixel values of the pixels obtained through conversion, to obtain a frame of event signal in the voxel grid format obtained through format conversion.

Manner 2: Space-dimension format conversion is performed on the event signal at the at least one moment included in the target sub-period, to obtain a frame of event signal obtained through format conversion.

Event polarities of pixels included in the event signal at each of the at least one moment are determined. Event polarities of the pixels at a same location in the event signal at the at least one moment are accumulated, to obtain the frame of event signal obtained through format conversion.

For any pixel in the event signal at each moment, corresponding event polarities of the pixel in the event signal at the at least one moment are accumulated, to obtain a pixel value of the pixel in the frame of event signal obtained through format conversion. In this way, for pixels in the event signal at the at least one moment, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (6):

$$K(u,\ v,\ N_i) = \sum_{t_{start}<t_j<t_{end}} p_j\delta(u-x_j)\delta(v-y_j) \tag{6}$$

In the foregoing formula (6), $$K(u, v, N_i)$$

represents the pixel value of the pixel $$(u, v)$$

in the frame of the event signal, whose frame sequence number is $$N_i,$$

obtained through format conversion.

The frame of event signal obtained through format conversion in the foregoing manner 2 is an event signal in the event frame format. In other words, when the first event signal is an event signal in a stream format, according to the method provided in the foregoing manner 2, the accumulated value of the event polarities corresponding to the pixels is used as the pixel values of the pixels obtained through conversion, to obtain a frame of event signal in the event frame format obtained through format conversion. Certainly, in an actual application, a total quantity of event polarities corresponding to pixels can be further used as pixel values of converted pixels, to obtain the frame of event signal in the event frame format obtained through format conversion. This is not limited in embodiments of the present disclosure.

Manner 3: Time-dimension format conversion is performed on the event signal at the at least one moment included in the target sub-period, to obtain a frame of event signal obtained through format conversion.

For the pixels at a same location in the event signal at the at least one moment, spatial location coordinates of the pixel obtained through conversion are determined from a correspondence between spatial location coordinates before conversion and spatial location coordinates after conversion based on spatial location coordinates of the pixel in the event signal at each moment. If luminance changes of the pixels are recorded in event signals at all moments in the event signal at the at least one moment, a largest timestamp in timestamps of the event signal at the at least one moment is determined as a pixel value on the spatial location coordinates of the pixel obtained through conversion. If luminance changes of the pixels are recorded in event signals at some moments in the event signal at the at least one moment, a largest timestamp in timestamps of the event signals at some moments is determined as a pixel value on the spatial location coordinates of the pixel obtained through conversion. The frame of event signal obtained through format conversion is formed by using the pixel value on the spatial location coordinates of the pixel obtained through conversion.

It should be noted that, for any pixel in the event signal at the at least one moment, according to the foregoing method, the event signals in which the luminance changes of the pixels are recorded are directly selected from the event signal at the at least one moment, and a largest timestamp in timestamps of the selected event signals is determined as the pixel value on the spatial location coordinates of the pixel obtained through conversion. This is merely an example. In some other embodiments, the pixel values of the pixels in the frame of event signal obtained through format conversion can alternatively be determined in another manner. For example, the event signal at the at least one moment is sorted in ascending order of timestamps, to obtain a sorting result of the event signal at the at least one moment. Spatial location coordinates of pixels in the frame of event signal obtained through format conversion are determined based on the spatial location coordinates of pixels in the event signal at the at least one moment. The pixel values of the pixels obtained through conversion are determined based on the sorting result and a timestamp of the event signal at each of the at least one moment.

For any pixel in an event signal at a first moment in the sorting result, spatial location coordinates of the pixel obtained through conversion are determined from a correspondence between spatial location coordinates before conversion and spatial location coordinates after conversion based on spatial location coordinates of the pixel in the event signal at the first moment. Then, a timestamp of the event signal at the first moment is determined as the pixel value on the spatial location coordinates of the pixel obtained through conversion. In this way, for pixels in the event signal at the first moment, pixel values on the spatial location coordinates of the pixels obtained through conversion can all be determined based on the foregoing steps. Then, the event signal at the at least one moment is successively traversed according to a same method, to obtain the pixel value of the pixel in the frame of event signal obtained through format conversion. In this way, for pixels in the event signal at the at least one moment, pixel values of the pixels in the frame of event signal obtained through format conversion can all be determined based on the foregoing steps, to obtain the frame of event signal obtained through format conversion.

The frame of event signal obtained through format conversion in the foregoing manner 3 is an event signal in the time plane format. In other words, when the first event signal is an event signal in a stream format, according to the method provided in the foregoing manner 3, a timestamp corresponding to a polarity event that last occurs on the pixels is used as target pixel values corresponding to the pixels, to obtain a frame of event signal in the time plane format obtained through format conversion.

Manner 4: Based on the image signal, time-dimension and space-dimension format conversion is performed on the event signal at the at least one moment included in the target sub-period, to obtain a frame of event signal obtained through format conversion.

Event polarities of pixels included in the event signal at each of the at least one moment are determined. Positive polarity values of the pixels included in the event signal at each moment are determined based on the event polarities of the pixels included in the event signal at each of the at least one moment and a positive variation threshold. Negative polarity values of the pixels included in the event signal at each moment are determined based on the event polarities of the pixels included in the event signal at each of the at least one moment and a negative variation threshold. The frame of event signal obtained through format conversion is determined based on the positive polarity values of the pixels included in the event signal at each of the at least one moment, the negative polarity values of the pixels included in the event signal at each of the at least one moment, and the image signal.

For any pixel in the event signal at each moment, an absolute value of the event polarity of the pixel in the event signal at the moment is multiplied by the positive variation threshold, to obtain a positive polarity value of the pixel in the event signal at the moment. The absolute value of the event polarity of the pixel in the event signal at the moment is multiplied by the negative variation threshold, to obtain a negative polarity value of the pixel in the event signal at the moment. Then, a positive polarity value corresponding to the pixel in the event signal at the at least one moment and a negative polarity value of the pixel in the event signal at the at least one moment are accumulated, and a calculation result obtained through accumulation is multiplied by a pixel value of the pixel in the image signal, to obtain a pixel value of the pixel in the frame of event signal obtained through format conversion. In this way, for pixels in the event signal at the at least one moment, pixel values of the pixels in the frame of event signal obtained through format conversion can all be determined based on the foregoing steps, to obtain the frame of event signal obtained through format conversion.

For example, a pixel value of any pixel in the frame of event signal obtained through format conversion is determined according to the following formula (7):

$$K(u, v, N_i) = f\left(\sum_{t_{start}<t_j<t_{end}} \delta(u-x_j)\delta(v-y_j)\left(C^+\delta(p_j-1) + C^-\delta(p_j+1)\right)\right) \times L(u, v) \tag{7}$$

In the foregoing formula (7), $$K(u, v, N_i)$$

represents the pixel value of the pixel $$(u, v)$$

in the frame of event signal, whose frame sequence number is $$N_i,$$

obtained through format conversion, $$C^+\delta(p_j-1)\delta(u-x_j)\delta(v-y_j)$$

represents a positive polarity value corresponding to the pixel $$(u, v)$$

in the event signal at the moment $$t_j,$$

and $$C^-\delta(p_j+1)\delta(u-x_j)\delta(v-y_j)$$

represents a negative polarity value corresponding to the pixel $$(u, v)$$

in the event signal at the moment $$t_j.$$

According to the method provided in the foregoing manner 4, format conversion is performed on the first event signal based on the obtained image signal, so that the converted second event signal can more accurately indicate luminance information of the pixel at different moments within the exposure time period.

Step 703: Fuse the second event signal and the image signal, to obtain a fused signal.

The following operations are performed on each of the N frames of event signals: determining a mask area in a frame of event signal, where the mask area indicates an area in which a pixel having motion information in the corresponding frame of event signal is located; and fusing pixel values of pixels located in the mask area and pixel values of corresponding pixels in the image signal, and setting pixel values of pixels located outside the mask area to the pixel values of the corresponding pixels in the image signal, to obtain a frame of fused signal.

Because processes of fusing all of the N frames of event signals and the image signal are the same, a frame of event signal is selected from the N frames of event signals, and the frame of event signal is used as an example to describe a process of fusing the frame of event signal and the image signal to obtain a frame of fused signal.

Pixel values of pixels in the frame of event signal may be 0, or may not be 0. If a pixel value of a pixel is 0, it indicates that the pixel does not have motion information at a moment indicated by the frame of event signal. If a pixel value of a pixel is not 0, it indicates that the pixel has motion information at a moment indicated by the frame of event signal. In this way, an area in which a pixel having the motion information in the frame of event signal is located is determined as a mask area corresponding to the frame of event signal.

For example, a mask signal corresponding to the frame of event signal is generated based on pixel values of pixels in the frame of event signal. In other words, for any pixel in the frame of event signal, when a pixel value of the pixel is 0, a value of a mask array corresponding to the pixel is set to a first value. When the pixel value of the pixel is not 0, the value of the mask array corresponding to the pixel is set to a second value. The mask signal corresponding to the frame of event signal is formed by using a value of a mask array corresponding to the pixels in the frame of event signal. An area enclosed by the mask array whose value is the second value in the mask signal is the mask area corresponding to the frame of event signal.

The first value and the second value are preset. For example, the first value is 0, and the second value is 1. In addition, the first value and the second value can alternatively be adjusted based on different requirements.

Based on spatial location coordinates of any pixel in the frame of event signal, a pixel whose spatial location coordinates are the same as those of the pixel is selected from the image signal, to obtain a pixel corresponding to the pixel in the image signal. When the pixel is located in the mask area corresponding to the frame of event signal, a pixel value of the pixel in the frame of event signal and a pixel value of the pixel in the image signal are fused, to obtain a pixel value of the pixel in the frame of fused signal. When the pixel is located outside the mask area corresponding to the frame of event signal, the pixel value of the pixel in the image signal is determined as the pixel value of the pixel in the frame of fused signal. In this way, for the pixels in the frame of event signal, pixel values of the pixels in the frame of fused signal can all be determined based on the foregoing steps, to obtain a frame of fused signal.

In other words, pixels outside the mask area are shielded by using the mask area corresponding to the frame of event signal, and there is no need to perform fusion of the event signal and the image signal on the pixels outside the mask area.

When the pixel value of the pixel in the frame of event signal and the pixel value of the pixel in the image signal are fused, the pixel value of the pixel in the frame of event signal and the pixel value of the pixel in the image signal can be directly added, and the pixel value of the pixel in the image signal can alternatively be replaced with the pixel value of the pixel in the frame of event signal. Certainly, in an actual application, the pixel value of the pixel in the frame of event signal and the pixel value of the pixel in the image signal can alternatively be fused in another manner. This is not limited in embodiments of the present disclosure.

It should be noted that, after the fused signal is obtained based on the foregoing steps 701 to 703, the fused signal can be further used as an input of a downstream task. The downstream task includes scenes of video frame interpolation, image deblurring processing, image super-resolution processing, target object monitoring, depth estimation, and the like.

For example, the target scene is an autonomous driving scenario. After the fused signal is obtained based on the foregoing steps, the fused signal is input into a neural network model, to obtain scenario awareness information of the autonomous driving scenario. In other words, the fused signal is used as an input of a downstream task that is the autonomous driving scenario, to perceive information about a road condition, a vehicle, a pedestrian, an environment change, and the like in the autonomous driving scenario.

Optionally, before the second event signal and the image signal are fused, the second event signal and the image signal can be preprocessed separately, to improve image quality of the second event signal and the image signal, and further improve image quality of the fused signal. For example, filtering processing is performed on the second event signal to eliminate noise and a defective pixel in the second event signal. Interpolation processing, noise reduction processing, demosaicing processing, white balance processing, and the like are performed on the image signal.

The filtering processing performed on the second event signal includes median filtering, Gaussian filtering, and the like. Certainly, in an actual application, the second event signal and the image signal can be further preprocessed in another manner. This is not limited in embodiments of the present disclosure.

In this embodiment of the present disclosure, time-dimension and/or space-dimension format conversion are and/or is performed on the first event signal, to obtain the second event signal. The second event signal is the event signal in the frame format, in other words, a format of the second event signal is similar to a format of the image signal. Therefore, the second event signal has resolution, and the resolution of the second event signal is the same as the resolution of the image signal. In this way, the second event signal and the image signal can be better fused. In addition, the image signal indicates luminance information of a plurality of pixels within an exposure time period, and the event signal indicates motion information of the plurality of pixels within the exposure time period. Therefore, the event signal and the image signal are fused, and the obtained fused signal includes both the luminance information of the plurality of pixels and the motion information of the plurality of pixels. In this way, image quality can be improved by using a dense fused signal that has both luminance information and motion information.

Figure 9:
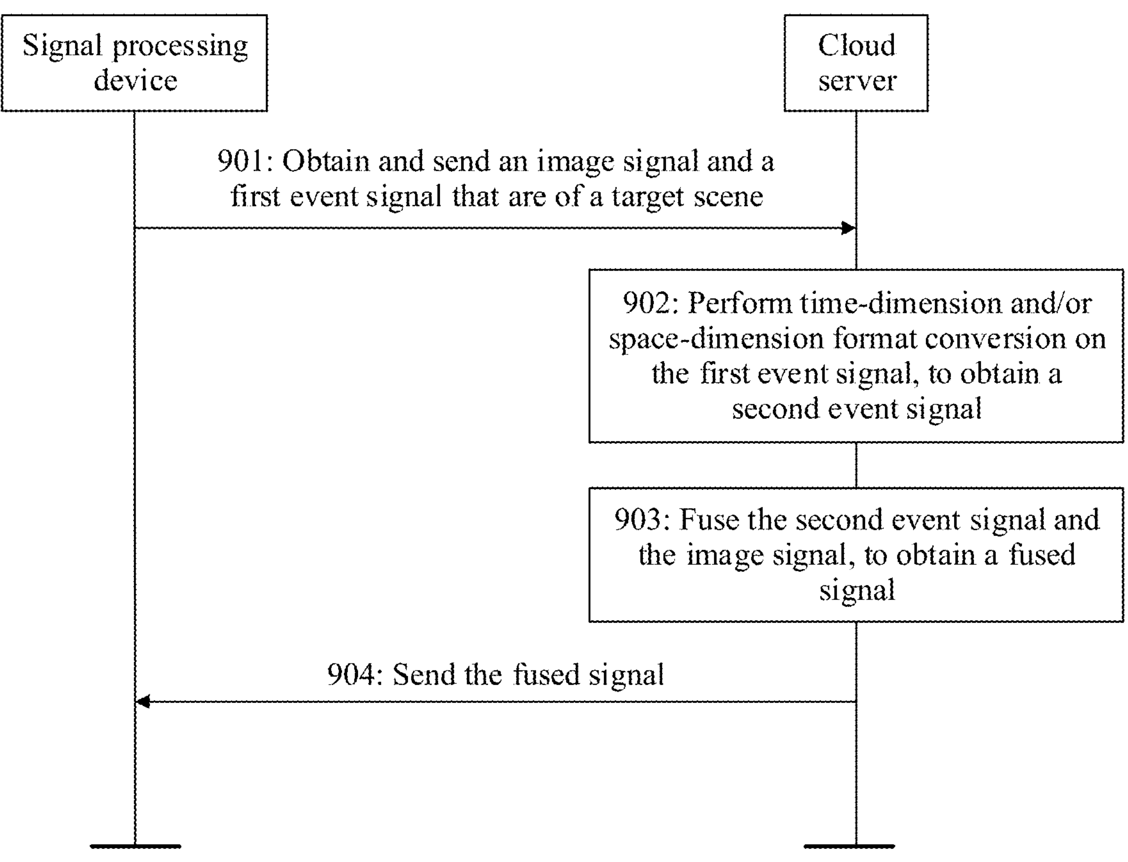
FIG. 9 is a flowchart of another signal processing method according to an embodiment of the present disclosure.

FIG. 9 is a flowchart of another signal processing method according to an embodiment of the present disclosure. The signal processing method provided in this embodiment of the present disclosure is executed by a signal processing device and a cloud server through interaction. Refer to FIG. 9. The method includes the following steps.

Step 901: The signal processing device obtains an image signal and a first event signal that are of a target scene, and sends the image signal and the first event signal that are of the target scene to the cloud server. The image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format.

For a process in which the signal processing device obtains the image signal and the first event signal that are of the target scene, refer to the related descriptions in step 701.

Step 902: The cloud server receives the image signal and the first event signal that are of the target scene and that are sent by the signal processing device, and performs time-dimension and/or space-dimension format conversion on the first event signal, to obtain a second event signal, where the second event signal is an event signal in a frame format, and resolution of the second event signal is the same as resolution of the image signal.

Based on the foregoing description, the first event signal includes the event signal in the frame format and the event signal in the stream format. In different cases, manners in which the cloud server performs time-dimension and/or space-dimension format conversion on the first event signal to obtain the second event signal are different. The following two cases are separately described.

In a first case, the first event signal is the event signal in the frame format, the first event signal includes M frames of event signals, the second event signal includes N frames of event signals, both M and N are integers greater than or equal to 1, and M is greater than or equal to N. In this case, the M frames of event signals are grouped into N groups of event signals based on frame sequence numbers, and each of the N groups of event signals includes at least one frame of event signal with consecutive frame sequence numbers. Time-dimension and/or space-dimension format conversion are and/or is performed on each of the N groups of event signals, to obtain the N frames of event signals.

In a second case, the first event signal is the event signal in the stream format, the first event signal includes event signals at H moments, the H moments are within the exposure time period, the second event signal includes N frames of event signals, and both H and N are integers greater than or equal to 1. In this case, the exposure time period is divided into N sub-periods, and each of the N sub-periods includes an event signal at at least one of the H moments. Time-dimension and/or space-dimension format conversion are and/or is performed on the event signal included in each of the N sub-periods, to obtain the N frames of event signals.

In the foregoing two cases, a process in which the cloud server performs format conversion on the first event signal is similar to the process in which the signal processing device performs format conversion on the first event signal in step 702, and therefore, may refer to related content in step 702.

Step 903: The cloud server fuses the second event signal and the image signal, to obtain a fused signal.

The cloud server performs the following operations on each of the N frames of event signals: determining a mask area in a frame of event signal, where the mask area indicates an area in which a pixel having motion information in the corresponding frame of event signal is located; and fusing pixel values of pixels located in the mask area and pixel values of corresponding pixels in the image signal, and setting pixel values of pixels located outside the mask area to the pixel values of the corresponding pixels in the image signal, to obtain a frame of fused signal.

Step 904: The cloud server sends the fused signal to the signal processing device.

After obtaining the fused signal based on the foregoing steps, the cloud server sends the fused signal to the signal processing device. After receiving the fused signal sent by the cloud server, the signal processing device uses the fused signal as an input of a downstream task. The downstream task includes any one of video frame interpolation, image deblurring processing, image super-division processing, target object monitoring, and depth estimation.

For example, the target scene is an autonomous driving scenario. After the fused signal is obtained based on the foregoing steps, the fused signal is input into a neural network model, to obtain scenario awareness information of the autonomous driving scenario. In other words, the fused signal is used as an input of a downstream task that is the autonomous driving scenario, to perceive information about a road condition, a vehicle, a pedestrian, an environment change, and the like in the autonomous driving scenario.

In this embodiment of the present disclosure, time-dimension and/or space-dimension format conversion are and/or is performed on the first event signal, to obtain the second event signal. The second event signal is the event signal in the frame format, in other words, a format of the second event signal is similar to a format of the image signal. Therefore, the second event signal has resolution, and the resolution of the second event signal is the same as the resolution of the image signal. In this way, the second event signal and the image signal can be better fused. In addition, the image signal indicates luminance information of a plurality of pixels within an exposure time period, and the event signal indicates motion information of the plurality of pixels within the exposure time period. Therefore, the event signal and the image signal are fused, and the obtained fused signal includes both the luminance information of the plurality of pixels and the motion information of the plurality of pixels. In this way, image quality can be improved by using a dense fused signal that has both luminance information and motion information.

Figure 10:
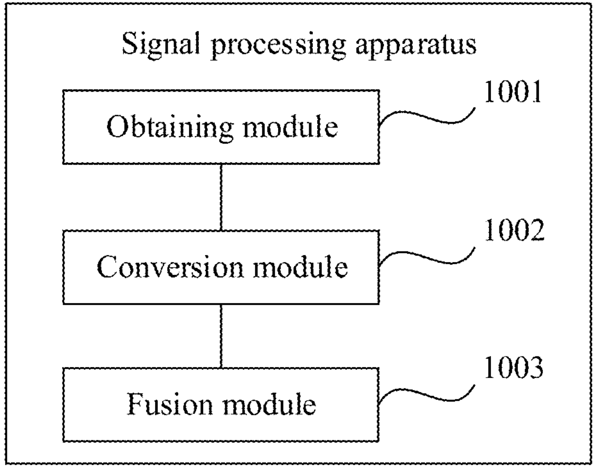
FIG. 10 is a diagram of a structure of a signal processing apparatus according to an embodiment of the present disclosure.

FIG. 10 is a diagram of a structure of a signal processing apparatus according to an embodiment of the present disclosure. The signal processing apparatus may be implemented as a part or all of a signal processing device by using software, hardware, or a combination thereof. Refer to FIG. 10. The apparatus includes an obtaining module 1001, a conversion module 1002, and a fusion module 1003.

The obtaining module 1001 is configured to obtain an image signal and a first event signal that are of a target scene, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format. For a detailed implementation process, refer to corresponding content in the foregoing embodiments.

The conversion module 1002 is configured to perform time-dimension and/or space-dimension format conversion on the first event signal, to obtain a second event signal, where the second event signal is an event signal in a frame format, and resolution of the second event signal is the same as resolution of the image signal. For a detailed implementation process, refer to corresponding content in the foregoing embodiments.

The fusion module 1003 is configured to fuse the second event signal and the image signal, to obtain a fused signal. For a detailed implementation process, refer to corresponding content in the foregoing embodiments.

Optionally, the first event signal is the event signal in the frame format, the first event signal includes M frames of event signals, the second event signal includes N frames of event signals, both M and N are integers greater than or equal to 1, and M is greater than or equal to N. The conversion module 1002 is specifically configured to: group the M frames of event signals into N groups of event signals based on frame sequence numbers, where each of the N groups of event signals includes at least one frame of event signal with consecutive frame sequence numbers; and perform time-dimension and/or space-dimension format conversion on each of the N groups of event signals, to obtain the N frames of event signals.

Optionally, the first event signal is the event signal in the stream format, the first event signal includes event signals at H moments, the H moments are within the exposure time period, the second event signal includes N frames of event signals, and both H and N are integers greater than or equal to 1. The conversion module 1002 is specifically configured to: divide the exposure time period into N sub-periods, where each of the N sub-periods includes an event signal at at least one of the H moments; and perform time-dimension and/or space-dimension format conversion on the event signal included in each of the N sub-periods, to obtain the N frames of event signals.

Optionally, a format of the second event signal is any one of an event frame format, a time plane format, and a voxel grid format.

Optionally, the second event signal includes the N frames of event signals, and N is an integer greater than or equal to 1. The fusion module 1003 is specifically configured to: perform the following operations on each of the N frames of event signals: determining a mask area in a frame of event signal, where the mask area indicates an area in which a pixel having motion information in the corresponding frame of event signal is located; and fusing pixel values of pixels located in the mask area and pixel values of corresponding pixels in the image signal, and setting pixel values of pixels located outside the mask area to the pixel values of the corresponding pixels in the image signal, to obtain a frame of fused signal.

Optionally, the target scene is an autonomous driving scenario, and the apparatus further includes: an input module configured to input the fused signal into a neural network model, to obtain scenario awareness information of the autonomous driving scenario.

In this embodiment of the present disclosure, time-dimension and/or space-dimension format conversion are and/or is performed on the first event signal, to obtain the second event signal. The second event signal is the event signal in the frame format, in other words, the format of the second event signal is similar to a format of the image signal. Therefore, the second event signal has resolution, and the resolution of the second event signal is the same as the resolution of the image signal. In this way, the second event signal and the image signal can be better fused. In addition, the image signal indicates luminance information of a plurality of pixels within an exposure time period, and the event signal indicates motion information of the plurality of pixels within the exposure time period. Therefore, the event signal and the image signal are fused, and the obtained fused signal includes both the luminance information of the plurality of pixels and the motion information of the plurality of pixels. In this way, image quality can be improved by using a dense fused signal that has both luminance information and motion information.

It should be noted that, when the signal processing apparatus provided in the foregoing embodiment processes a signal, division into the foregoing functional modules is merely used as an example for description. In an actual application, the foregoing functions may be allocated to different functional modules for implementation based on a requirement. In other words, an internal structure of the apparatus is divided into different functional modules, to complete all or a part of the functions described above. In addition, the signal processing apparatus provided in the foregoing embodiment and the embodiment of the signal processing method belong to a same concept. For a specific implementation process of the apparatus, refer to the method embodiment.

Figure 11:
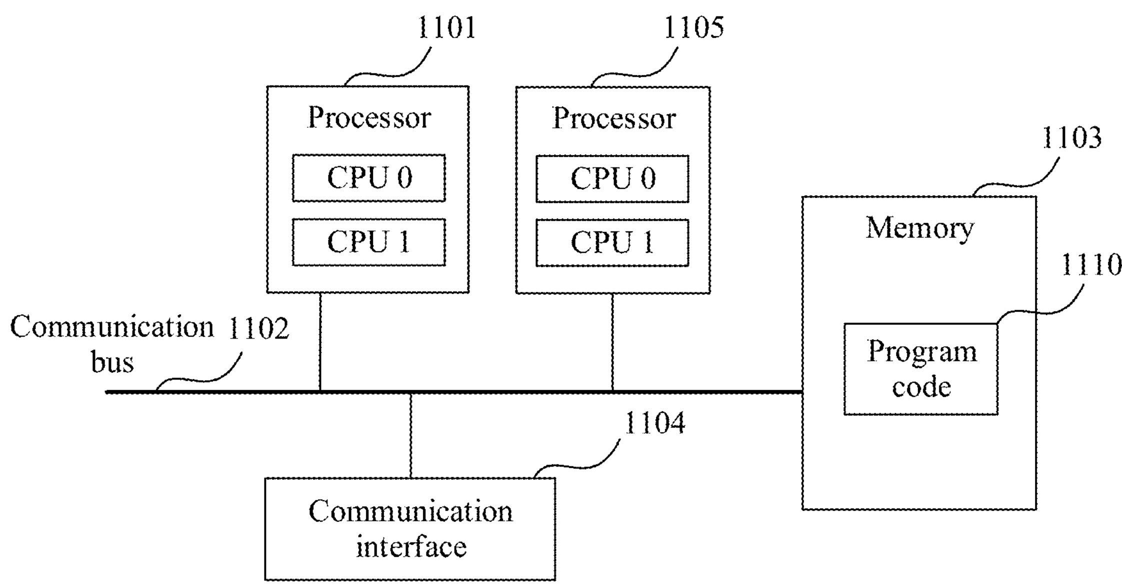
FIG. 11 is a diagram of a structure of a computer device according to an embodiment of the present disclosure.

FIG. 11 is a diagram of a structure of a computer device according to an embodiment of the present disclosure. The computer device is the foregoing signal processing device or cloud server. The computer device includes at least one processor 1101, a communication bus 1102, a memory 1103, and at least one communication interface 1104.

The processor 1101 may be a general-purpose central processing unit (CPU), a network processor (NP), or a microprocessor, or may be one or more integrated circuits configured to implement the solutions of the present disclosure, for example, an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The communication bus 1102 is configured to transfer information between the foregoing components. The communication bus 1102 may be classified into an address bus, a data bus, a control bus, and the like. For ease of representation, only one bold line is used to represent the communication bus in the figure, but this does not mean that there is only one bus or only one type of bus.

The memory 1103 may be a read-only memory (ROM), a random-access memory (RAM), an electrically erasable programmable ROM (EEPROM), an optical disc (including a compact disc ROM (CD-ROM), a compact disc, a laser disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory 1103 is not limited thereto. The memory 1103 may exist independently, and is connected to the processor 1101 through the communication bus 1102. The memory 1103 may alternatively be integrated with the processor 1101.

The communication interface 1104 is configured to communicate with another device or a communication network by using any apparatus like a transceiver. The communication interface 1104 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

In a specific implementation, in an embodiment, the processor 1101 may include one or more CPUs, for example, a CPU 0 and a CPU 1 shown in FIG. 11.

In a specific implementation, in an embodiment, the computer device may include a plurality of processors, for example, the processor 1101 and a processor 1105 shown in FIG. 11. Each of the processors may be a single-core processor, or may be a multi-core processor. The processor herein may be one or more devices, circuits, and/or processing cores configured to process data (for example, computer program instructions).

In a specific implementation, in an embodiment, the electronic device may further include an output device 1106 and an input device 1107. The output device 1106 communicates with the processor 1101, and may display information in a plurality of manners. For example, the output device 1106 may be a liquid-crystal display (LCD), a light-emitting diode (LED) display device, a cathode-ray tube (CRT) display device, a projector, or the like. The input device 1107 communicates with the processor 1101, and may receive an input from a user in a plurality of manners. For example, the input device 1107 may be a mouse, a keyboard, a touchscreen device, or a sensor device.

In some embodiments, the memory 1103 is configured to store program code 1110 for executing the solutions of the present disclosure, and the processor 1101 may execute the program code 1110 stored in the memory 1103. The program code 1110 may include one or more software modules. The computer device may implement, by using the processor

1101 and the program code 1110 in the memory 1103, the signal processing method provided in the embodiment in FIG. 7 or FIG. 9.

In other words, for a cloud server, the cloud server includes a communication interface and one or more processors.

The communication interface is configured to receive an image signal and a first event signal that are of a target scene and that are sent by a signal processing device, where the image signal indicates luminance information of a plurality of pixels corresponding to the target scene within an exposure time period, the first event signal indicates motion information of the plurality of pixels within the exposure time period, and the first event signal is an event signal in a frame format or an event signal in a stream format. For a detailed implementation process, refer to corresponding content in the foregoing embodiments.

The one or more processors are configured to perform time-dimension and/or space-dimension format conversion on the first event signal, to obtain a second event signal, where the second event signal is an event signal in a frame format, and resolution of the second event signal is the same as resolution of the image signal. For a detailed implementation process, refer to corresponding content in the foregoing embodiments.

The one or more processors are configured to fuse the second event signal and the image signal, to obtain a fused signal. For a detailed implementation process, refer to corresponding content in the foregoing embodiments.

The one or more processors are configured to send the fused signal to the signal processing device through the communication interface. For a detailed implementation process, refer to corresponding content in the foregoing embodiments.

Figure 12:
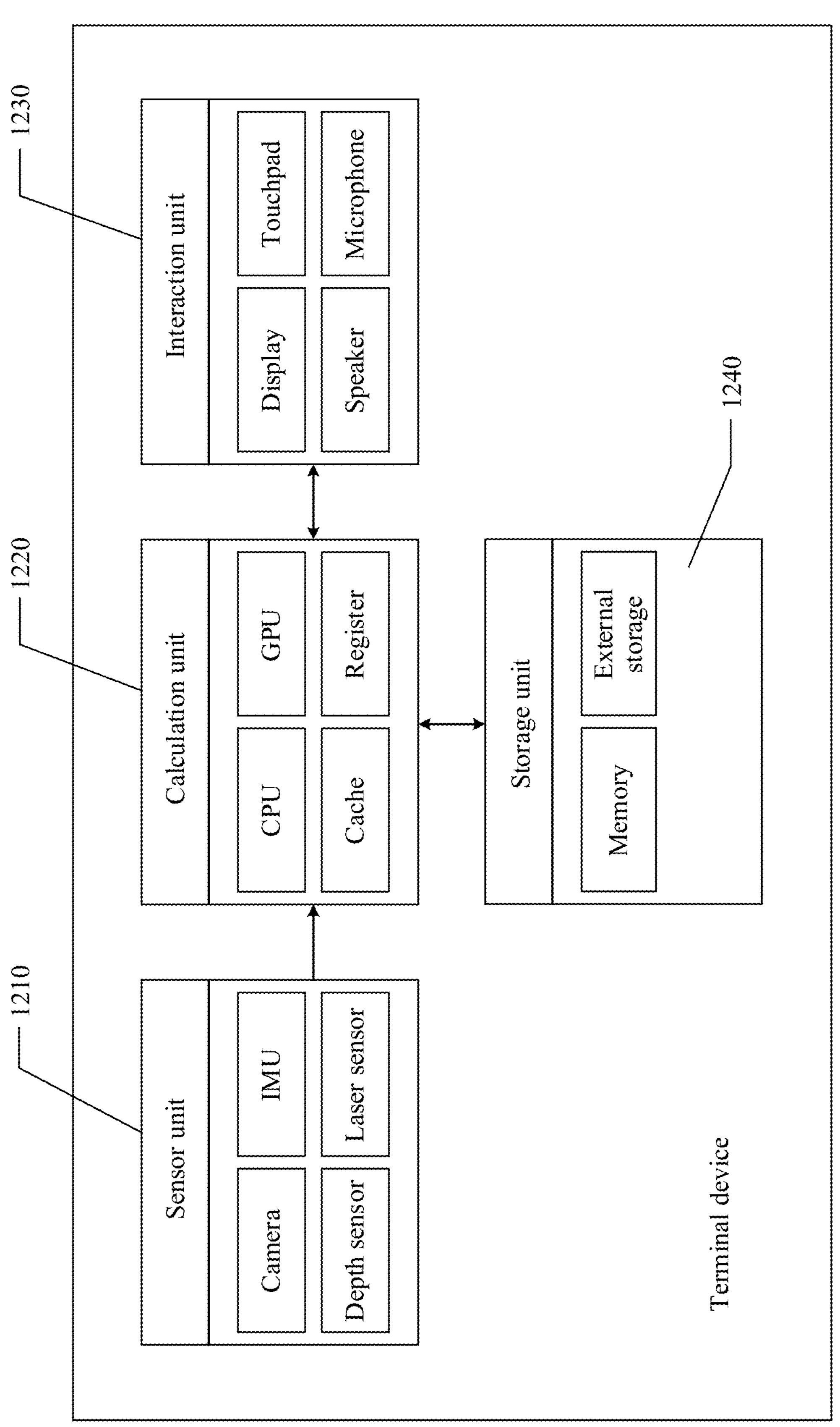
FIG. 12 is a diagram of a structure of a terminal device according to an embodiment of the present disclosure.

FIG. 12 is a diagram of a structure of a terminal device according to an embodiment of the present disclosure. The terminal device may be the foregoing signal processing device. The terminal device includes a sensor unit 1210, a calculation unit 1220, a storage unit 1240, and an interaction unit 1230.

The sensor unit 1210 usually includes a visual sensor (for example, a camera), a depth sensor, an IMU, a laser sensor, and the like.

The calculation unit 1220 usually includes a CPU, a GPU, a cache, a register, and the like, and is mainly configured to run an operating system.

The storage unit 1240 mainly includes a memory and an external storage, and is mainly configured to: read and write local and temporary data and the like.

The interaction unit 1230 mainly includes a display, a touchpad, a speaker, a microphone, and the like, and is mainly configured to: interact with a user, obtain a user input, implement and present an algorithm effect, and the like.

Figure 13:
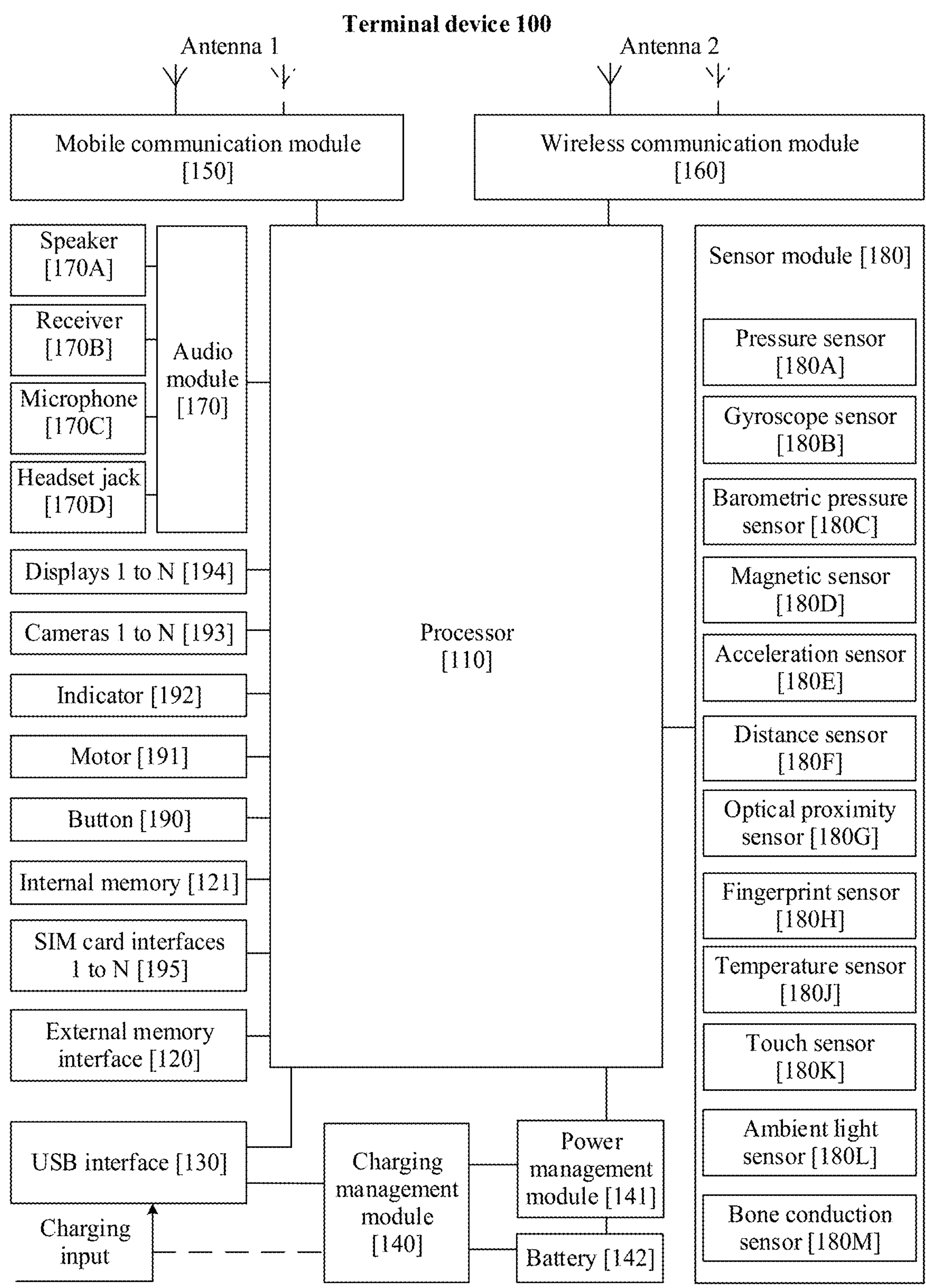
FIG. 13 is a diagram of a structure of another terminal device according to an embodiment of the present disclosure.

For ease of understanding, the following describes, by using an example, a structure of a terminal device 100 provided in an embodiment of the present disclosure. FIG. 13 is a diagram of a structure of a terminal device according to an embodiment of the present disclosure.

As shown in FIG. 13, the terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and the like.

It can be understood that the structure shown in this embodiment of the present disclosure does not constitute a specific limitation on the terminal device 100. In some other embodiments of the present disclosure, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The processor 110 may execute a computer program, to implement any method in embodiments of the present disclosure.

The controller may be a nerve center and a command center of the terminal device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor 110 may directly invoke the instructions or the data from the memory, to avoid repeated access and reduce waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

It can be understood that an interface connection relationship between the modules shown in this embodiment of the present disclosure is merely an example for description, and constitutes no limitation on the structure of the terminal device 100. In some other embodiments of the present disclosure, different interface connection manners in the foregoing embodiments or a combination of a plurality of interface connection manners may alternatively be used for the terminal device 100.

The charging management module 140 is configured to receive a charging input from a charger. The charger may be a wireless charger or a wired charger. In some embodiments of wired charging, the charging management module 140 may receive a charging input of a wired charger through the USB interface 130.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the terminal device 100 may be implemented via the antenna 1, the antenna 2, the mobile communication module 150, the wireless communication module 160, the modem processor, the baseband processor, and the like.

In some feasible implementations, the terminal device 100 may communicate with another device by using a wireless communication function. For example, the terminal device 100 may communicate with a second electronic device, the terminal device 100 establishes a projection connection to the second electronic device, and the terminal device 100 outputs projection data to the second electronic device. The projection data output by the terminal device 100 may be audio and video data.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution to wireless communication that is applied to the terminal device 100 and that includes first-generation (1G)/third-generation (3G)/fourth-generation (4G)/fifth-generation (5G) or the like. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communication module 150 or another function module.

The wireless communication module 160 may provide a solution applied to the terminal device 100 for wireless communication including a WLAN (such as a Wi-Fi network), Bluetooth (BT), a global navigation satellite system (GNSS), frequency modulation (FM), a near-field communication (NFC) technology, an infrared (IR) technology, and the like. The wireless communication module 160 may be one or more components integrating at least one communication processor module. The wireless communication module 160 receives an electromagnetic wave through the antenna 1, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal device 100, the antenna 1 is coupled to the mobile communication module 150, and the antenna 2 is coupled to the wireless communication module 160, so that the terminal device 100 can communicate with a network and another device by using a wireless communication technology. The wireless communication technology may include a Global System for Mobile Communications (GSM), a general packet radio service (GPRS), code-division multiple access (CDMA), wideband CDMA (WCDMA), time-division-synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a LCD, an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal device 100 may include one or N displays 194, where N is a positive integer greater than 1.

In some feasible implementations, the display 194 may be configured to display interfaces output by a system of the terminal device 100.

The terminal device 100 may implement a photographing function via the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive may be a CCD or a CMOS phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to a digital image signal.

The video codec is configured to compress or decompress a digital video. The terminal device 100 may support one or more video codecs. In this way, the terminal device 100 may play or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. The NPU may be used to implement applications such as intelligent cognition of the terminal device 100, for example, image recognition, facial recognition, voice recognition, and text understanding.

The external memory interface 120 may be configured to connect to an external storage card, for example, a micro storage-device (SD) card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the terminal device 100. The internal memory 121 may include a program storage area and a data storage area. The program storage area may store an operating system, an application required by at least one function, and the like. The data storage area may store data (for example, audio data or an address book) created in a process of using the terminal device 100, and the like. In addition, the internal memory 121 may include a high-speed RAM, or may include a nonvolatile memory, for example, at least one magnetic disk storage device, a flash memory, or a universal flash storage (UFS).

The terminal device 100 may implement an audio function, for example, music playing or recording, via the audio module 170, the speaker 170A, the receiver 170B, the microphone 170C, the headset jack 170D, the application processor, and the like. In some feasible implementations, the audio module 170 may be configured to play a sound corresponding to a video. For example, when the display 194 displays a video play picture, the audio module 170 outputs a video play sound.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 millimeter (mm) Open Mobile Terminal Platform (OMTP) standard interface or Cellular Telecommunications Industry Association (CTIA) standard interface.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the terminal device 100. The barometric pressure sensor 180C is configured to measure barometric pressure.

The acceleration sensor 180E may detect accelerations in various directions (including three axes or six axes) of the terminal device 100. When the terminal device 100 is still, a magnitude and a direction of gravity may be detected. The acceleration sensor 180E may be further configured to identify a posture of the terminal device, and is used in an application such as switching between a landscape mode and a portrait mode or a pedometer.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. Visual output related to the touch operation may be provided through the display 194. In some other embodiments, the touch sensor 180K may also be disposed on a surface of the terminal device 100 at a location different from that of the display 194.

The button 190 includes a power button, a volume button, and the like. The button 190 may be a mechanical button, or may be a touch button. The terminal device 100 may receive a key input, and generate a key signal input related to a user setting and function control of the terminal device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital-versatile disc (DVD)), a semiconductor medium (for example, a solid-state drive (SSD)), or the like. It should be noted that the computer-readable storage medium mentioned in embodiments of the present disclosure may be a non-volatile storage medium, that is, may be a non-transitory storage medium.

In other words, an embodiment of the present disclosure further provides a computer-readable storage medium. The computer-readable storage medium stores instructions. When the instructions are run on a computer, the computer is enabled to perform steps of the foregoing signal processing method.

An embodiment of the present disclosure further provides a computer program product including instructions. When the instructions are run on a computer, the computer is enabled to perform steps of the foregoing signal processing method. Alternatively, a computer program is provided. When the computer program is run on a computer, the computer is enabled to perform steps of the foregoing signal processing method.

It should be understood that "a plurality of" in this specification means two or more. In the descriptions of embodiments of the present disclosure, "/" represents "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe technical solutions in embodiments of the present disclosure, terms such as "first" and "second" are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, personal information of a user, and the like), data (including but not limited to data used for analysis, stored data, displayed data, and the like), and signals in embodiments of the present disclosure are used under authorization by the user or full authorization by all parties, and capturing, use, and processing of related data need to conform to related laws, regulations, and standards of related countries and regions. For example, both the image signal and the first event signal that are of the target scene according to embodiments of the present disclosure are obtained under full authorization.

The foregoing descriptions are merely embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method comprising:

obtaining an image signal and a first event signal that are of a target scene, wherein the image signal indicates luminance information of a plurality of pixels corresponding to the target scene within an exposure time period, wherein the first event signal indicates motion information of the plurality of pixels within the exposure time period, and wherein the first event signal is in a frame format or in a stream format;

performing at least one of time-dimension or space-dimension format conversion on the first event signal to obtain a second event signal, wherein the second event signal is in the frame format, and wherein a first resolution of the second event signal is equal to a second resolution of the image signal; and fusing the second event signal and the image signal; to obtain a fused signal.

2. The method of claim 1, wherein the first event signal is in the frame format and comprises M frames of event signals, wherein the second event signal comprises N frames of the event signals, wherein both M and N are integers greater than or equal to 1, wherein M is greater than or equal to N, and wherein performing the at least one of the time-dimension or the space-dimension format conversion on the first event signal, to obtain the second event signal comprises:

grouping the M frames of the event signals into N groups of the event signals based on frame sequence numbers, wherein each of the N groups comprises at least one frame of the event signals with consecutive frame sequence numbers; and performing the at least one of the time-dimension or the space-dimension format conversion on each of the N groups to obtain the N frames.

3. The method of claim 1, wherein the first event signal is in the stream format and comprises the event signals at H moments, wherein the H moments are within the exposure time period, wherein the second event signal comprises N frames of the event signals, wherein both H and N are integers greater than or equal to 1, and wherein the performing the at least one of the time-dimension or the space-dimension format conversion on the first event signal to obtain the second event signal comprises:

dividing the exposure time period into N sub-periods, wherein each of the N sub-periods comprises an event signal at at least one of the H moments; and performing the at least one of the time-dimension or the space-dimension format conversion on the event signal comprised in each of the N sub-periods, to obtain the N frames.

4. The method of claim 1, wherein a format of the second event signal is any one of an event frame format, a time plane format, or a voxel grid format.

5. The method of claim 1, wherein the second event signal comprises N frames of the event signals, wherein N is an integer greater than or equal to 1, and wherein fusing the second event signal and the image signal to obtain the fused signal comprises performing the following operations on each of the N frames of the event signals:

determining a mask area in a frame of an event signal of the event signals, wherein the mask area indicates an area in which a pixel having the motion information in a corresponding frame of the event signal is located;

fusing first pixel values of first pixels located in the mask area and second pixel values of second pixels in the image signal corresponding to the first pixels, and setting third pixel values of third pixels located outside the mask area to the second pixel values to obtain a frame of fused signal.

6. The method of claim 1, wherein the target scene is an autonomous driving scenario, and wherein the method further comprises: inputting the fused signal into a neural network model, to obtain scenario awareness information of the autonomous driving scenario.

7. The method of claim 1, wherein the method is executed by a cloud server, wherein obtaining the image signal and the first event signal that are of the target scene comprises: receiving the image signal and the first event signal from a signal processing device, and wherein after fusing the second event signal and the image signal to obtain the fused signal, the method further comprises sending the fused signal to the signal processing device.

8. An apparatus comprising:

a memory configured to store instructions;

a communication interface is-configured to receive, from a signal processing device, an image signal and a first event signal that are of a target scene, wherein the image signal indicates luminance information of a plurality of pixels corresponding to the target scene within an exposure time period, wherein the first event signal indicates motion information of the plurality of pixels within the exposure time period, and wherein the first event signal is in a frame format or in a stream format; and one or more processors coupled to the memory and the communication interface, and configured to execute the instructions to cause the apparatus to:

perform at least one of time-dimension and/or space-dimension format conversion on the first event signal to obtain a second event signal, wherein the second event signal is in the frame format, and wherein a first resolution of the second event signal is equal to a second resolution of the image signal;

fuse the second event signal and the image signal to obtain a fused signal; and send the fused signal to the signal processing device through the communication interface.

9. The apparatus of claim 8, wherein the first event signal is in the frame format and comprises M frames of event signals, wherein the second event signal comprises N frames of the event signals, wherein both M and N are integers greater than or equal to 1, wherein M is greater than or equal to N, and wherein the one or more processors are further configured to execute the instructions to cause the apparatus to perform the at least one of the time-dimension or the space-dimension format conversion by:

grouping the M frames of the event signals into N groups of the event signals based on frame sequence numbers, wherein each of the N groups comprises at least one frame of the event signals with consecutive frame sequence numbers; and performing the at least one of the time-dimension or the space-dimension format conversion on each of the N groups, to obtain the N frames.

10. The apparatus of claim 8, wherein the first event signal is in the stream format and comprises the event signals at H moments, wherein the H moments are within the exposure time period, wherein the second event signal comprises N frames of the event signals, wherein both H and N are integers greater than or equal to 1, and wherein the one or more processors are further configured to execute the instructions to cause the apparatus to perform the at least one of the time-dimension or the space-dimension format conversion on the first event signal to obtain the second event signal by:

dividing the exposure time period into N sub-periods, wherein each of the N sub-periods comprises an event signal at at least one of the H moments; and performing the at least one of the time-dimension or the space-dimension format conversion on the event signal comprised in each of the N sub-periods; to obtain the N frames.

11. The apparatus of claim 8, wherein the second event signal comprises N frames of the event signals, wherein N is an integer greater than or equal to 1, and wherein one or more processors are further configured to execute the instructions to cause the apparatus to fuse the second event signal and the image signal to obtain the fused signal by performing the following operations on each of the N frames of the event signals:

determining a mask area in a frame of an event signal of the event signals, wherein the mask area indicates an area in which a pixel having the motion information in a corresponding frame of the event signal is located;

fusing first pixel values of first pixels located in the mask area and second pixel values of second pixels in the image signal corresponding to the first pixels; and setting third pixel values of third pixels located outside the mask area to the second pixel values to obtain a frame of fused signal.

12. A computer program product comprising computer-executable instructions stored on a non-transitory computer-readable storage medium, wherein the computer-executable instructions when executed by one or more processors of an apparatus, cause the apparatus to:

obtain an image signal and a first event signal that are of a target scene, wherein the image signal indicates luminance information of a plurality of pixels corresponding to the target scene within an exposure time period, wherein the first event signal indicates motion information of the plurality of pixels within the exposure time period, and wherein the first event signal is in a frame format or in a stream format;

perform at least one of time-dimension or space-dimension format conversion on the first event signal to obtain a second event signal, wherein the second event signal in the frame format, and wherein a first resolution of the second event signal is equal to a second resolution of the image signal; and fuse the second event signal and the image signal, to obtain a fused signal.

13. The computer program product of claim 12, wherein the first event signal is in the frame format and comprises M frames of event signals, wherein the second event signal comprises N frames of the event signals, wherein both M and N are integers greater than or equal to 1, wherein M is greater than or equal to N, and wherein performing the at least one of the time-dimension or the space-dimension format conversion on the first event signal to obtain the second event signal further causes the apparatus to:

group the M frames of the event signals into N groups of the event signals based on frame sequence numbers, wherein each of the N groups comprises at least one frame of the event signals with consecutive frame sequence numbers; and perform the at least one of the time-dimension or the space-dimension format conversion on each of the N groups to obtain the N frames.

14. The computer program product of claim 12, wherein the first event signal is in the stream format and comprises the event signals at H moments, wherein the H moments are within the exposure time period, wherein the second event signal comprises N frames of the event signals, wherein both H and N are integers greater than or equal to 1, and wherein performing the at least one of the time-dimension or the space-dimension format conversion on the first event signal to obtain the second event signal further causes the apparatus to:

divide the exposure time period into N sub-periods, wherein each of the N sub-periods comprises an event signal at at least one of the H moments; and perform the at least one of the time-dimension or the space-dimension format conversion on the event signal comprised in each of the N sub-periods; to obtain the N frames.

15. The computer program product of claim 12, wherein a format of the second event signal is any one of an event frame format, a time plane format, or a voxel grid format.

16. The computer program product of claim 12, wherein the second event signal comprises N frames of the event signals, wherein N is an integer greater than or equal to 1, and wherein fusing the second event signal and the image signal to obtain the fused signal further cause the apparatus to: perform the following operations on each of the N frames of the event signals:

determine a mask area in a frame of an event signal of the event signals, wherein the mask area indicates an area in which a pixel having the motion information in a corresponding frame of the event signal is located;

fuse first pixel values of first pixels located in the mask area and second pixel values of second pixels in the image signal corresponding to the first pixels; and set third pixel values of third pixels located outside the mask area to the second pixel values to obtain a frame of fused signal.

17. The computer program product of claim 12, wherein the target scene is an autonomous driving scenario, and wherein the computer-executable instructions when executed by the one or more processors, further cause the apparatus to: input the fused signal into a neural network model, to obtain scenario awareness information of the autonomous driving scenario.

18. The computer program product of claim 12, wherein the apparatus is a cloud server.

19. The computer program product of claim 18, wherein the computer-executable instructions when executed by the one or more processors, cause the apparatus to obtain the image signal and the first event signal by receiving the image signal and the first event signal from a signal processing device.

20. The computer program product of claim 19, wherein the computer-executable instructions when executed by the one or more processors, cause the apparatus to send, after fusing the second event signal and the image signal to obtain the fused signal, the fused signal to the signal processing device.

* * * * *